United States Patent
Kawata et al.

(10) Patent No.: US 10,822,683 B2
(45) Date of Patent: *Nov. 3, 2020

(54) HOT-DIP GALVANIZED STEEL SHEET

(71) Applicant: NIPPON STEEL CORPORATION, Tokyo (JP)

(72) Inventors: Hiroyuki Kawata, Kisarazu (JP); Takeshi Yasui, Jawa Barat (ID); Kohei Ueda, Chiba (JP); Naoki Maruyama, Kimitsu (JP); Yuji Yamaguchi, Kimitsu (JP); Satoshi Uchida, Kisarazu (JP); Ryosuke Komami, Kimitsu (JP); Hayato Arai, San Pedro (MX); Toyomitsu Nakamura, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 473 days.

This patent is subject to a terminal disclaimer.

(21) Appl. No.: 15/521,535

(22) PCT Filed: Nov. 5, 2015

(86) PCT No.: PCT/JP2015/081231
§ 371 (c)(1),
(2) Date: Apr. 24, 2017

(87) PCT Pub. No.: WO2016/072475
PCT Pub. Date: May 12, 2016

(65) Prior Publication Data
US 2017/0305114 A1    Oct. 26, 2017

(30) Foreign Application Priority Data

Nov. 5, 2014    (JP) .................. 2014-225398

(51) Int. Cl.
*B32B 15/01* (2006.01)
*C23C 2/06* (2006.01)
(Continued)

(52) U.S. Cl.
CPC .............. *C23C 2/06* (2013.01); *B32B 15/013* (2013.01); *C21D 8/0205* (2013.01);
(Continued)

(58) Field of Classification Search
None
See application file for complete search history.

(56) References Cited

U.S. PATENT DOCUMENTS

| 6,410,163 B1 | 6/2002 | Suzuki et al. |
| 2010/0304183 A1 | 12/2010 | Honda et al. |

(Continued)

FOREIGN PATENT DOCUMENTS

| CN | 101336308 A | 12/2008 |
| CN | 102753730 A | 10/2012 |

(Continued)

OTHER PUBLICATIONS

Korean Notice of Allowance, dated Aug. 1, 2018, for corresponding Korean Application No. 10-2017-7012050, with an English translation.

(Continued)

*Primary Examiner* — Xiaobei Wang
(74) *Attorney, Agent, or Firm* — Birch, Stewart, Kolasch & Birch, LLP

(57) ABSTRACT

A hot-dip galvanized steel sheet includes a base steel sheet and a hot-dip galvanized layer formed on at least one surface of the base steel sheet, in which the hot-dip galvanized layer includes Fe in a content of more than 0% to 5% or less, Al in a content of more than 0% to 1.0% or less, and columnar grains formed by a ζ phase on the surface of the steel sheet, (Continued)

further, 20% or more of the entire interface between the hot-dip galvanized layer and the base steel sheet is coated with the ζ phase, and a ratio of an interface formed between ζ grains in which coarse oxides are present among grains and the base steel sheet with respect to the entire interface between the ζ phase and the base steel sheet in the hot-dip galvanized layer is 50% or less, the base steel sheet has predetermined chemical components and a refined layer in direct contact with the interface between the base steel sheet and the hot-dip galvanized layer, an average thickness of the refined layer is 0.1 to 5.0 μm, an average grain size of ferrite in the refined layer is 0.1 to 3.0 μm, one or two or more of oxides of Si and Mn are contained in the refined layer, and a maximum size of the oxide is 0.01 to 0.4 μm, and a volume fraction of residual austenite in a range of 1/8 thickness to 3/8 thickness centered at a position of 1/4 thickness from the surface of the base steel sheet is 1% or more.

16 Claims, 1 Drawing Sheet

(51) Int. Cl.
  C22C 38/00      (2006.01)
  C22C 38/02      (2006.01)
  C22C 38/04      (2006.01)
  C22C 38/06      (2006.01)
  C22C 38/12      (2006.01)
  C22C 38/14      (2006.01)
  C22C 38/08      (2006.01)
  C22C 38/18      (2006.01)
  C21D 9/46       (2006.01)
  C21D 8/02       (2006.01)
  C22C 38/58      (2006.01)
  C23C 2/02       (2006.01)
  C23C 2/28       (2006.01)
  C22C 38/16      (2006.01)

(52) U.S. Cl.
  CPC ............ *C21D 8/0257* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/58* (2013.01); *C23C 2/02* (2013.01); *C23C 2/28* (2013.01); *B32B 2255/06* (2013.01); *B32B 2255/205* (2013.01); *B32B 2311/20* (2013.01)

(56)           References Cited

U.S. PATENT DOCUMENTS

| | | |
|---|---|---|
| 2012/0031528 A1 | 2/2012 | Hayashi et al. |
| 2012/0100391 A1* | 4/2012 | Lee .................. C23C 2/02 428/659 |
| 2012/0175028 A1 | 7/2012 | Matsuda et al. |
| 2012/0222781 A1* | 9/2012 | Azuma .................. C21D 9/46 148/518 |
| 2014/0212684 A1 | 7/2014 | Kawata et al. |
| 2014/0227555 A1* | 8/2014 | Kawata .................. B21B 1/26 428/659 |
| 2014/0234657 A1 | 8/2014 | Azuma et al. |
| 2014/0234659 A1 | 8/2014 | Kawata et al. |
| 2014/0234660 A1* | 8/2014 | Kawata .................. B21B 3/00 428/659 |
| 2014/0255725 A1 | 9/2014 | Yamanaka et al. |
| 2014/0377582 A1* | 12/2014 | Azuma .................. C23C 2/02 428/632 |
| 2015/0083278 A1 | 3/2015 | Kawata et al. |
| 2017/0313028 A1 | 11/2017 | Kawata et al. |

FOREIGN PATENT DOCUMENTS

| | | |
|---|---|---|
| CN | 102787271 A | 11/2012 |
| CN | 103328676 A | 9/2013 |
| CN | 103857819 A | 6/2014 |
| EP | 2 631 319 A1 | 8/2013 |
| EP | 2762585 A1 | 8/2014 |
| JP | 51-12575 | 4/1976 |
| JP | 9-157819 A | 6/1997 |
| JP | 9-157821 A | 6/1997 |
| JP | 9-176815 A | 7/1997 |
| JP | 9-241812 A | 9/1997 |
| JP | 11-140587 A | 5/1999 |
| JP | 2001-26853 A | 1/2001 |
| JP | 2001-303226 A | 10/2001 |
| JP | 2002-88459 A | 3/2002 |
| JP | 2002-167656 A | 6/2002 |
| JP | 2003-55751 A | 2/2003 |
| JP | 2003-73772 A | 3/2003 |
| JP | 2003-96541 A | 4/2003 |
| JP | 2004-124187 A | 4/2004 |
| JP | 2005-60742 A | 3/2005 |
| JP | 2005-60743 A | 3/2005 |
| JP | 2005-200750 A | 7/2005 |
| JP | 2006-63360 A | 3/2006 |
| JP | 2008-19465 A | 1/2008 |
| JP | 2008-24972 A | 2/2008 |
| JP | 2011-111675 A | 6/2011 |
| JP | 2013-541645 A | 11/2013 |
| KR | 10-2012-0031510 A | 4/2012 |
| KR | 10-2013-0006507 A | 1/2013 |
| KR | 10-2014-0030785 A | 3/2014 |
| TW | 201319267 A1 | 5/2013 |
| TW | 201329251 A1 | 7/2013 |
| TW | 201329252 A1 | 7/2013 |
| TW | 201331383 A1 | 8/2013 |
| WO | WO 2013/018739 A1 | 2/2013 |
| WO | WO 2013/047755 A1 | 4/2013 |
| WO | WO2013047755 * | 4/2013 |
| WO | WO2013118679 * | 8/2013 |
| WO | WO 2016/072475 A1 | 5/2016 |

OTHER PUBLICATIONS

International Search Report for PCT/JP2015/081231 (PCT/ISA/210) dated Jan. 26, 2016.
International Search Report for PCT/JP2015/081236 (PCT/ISA/210) dated Jan. 26, 2016.
Taiwanese Office Action for Patent Application No. 104136604 dated Dec. 7, 2016.
Taiwanese Office Action for Patent Application No. 104136605 dated May 25, 2016.
Written Opinion of the International Searching Authority for PCT/JP2015/081231 (PCT/ISA/237) dated Jan. 26, 2016.
Chinese Office Action and Search Report for counterpart Chinese Application No. 201580058632.6, dated Oct. 31, 2018, with English translation for Search Report.
Chinese Office Action and Search Report for related Chinese Application No. 201580058649.1, dated Oct. 31, 2018, with English translation of the Search Report.
Korean Notice of Allowance, dated Aug. 17, 2018, for Korean Application No. 10-2017-7011181, with an English translation.
U.S. Office Action for U.S. Appl. No. 15/522,243, dated Apr. 8, 2019.
Extended European Search Report for European Application No. 15867390.7, dated Mar. 8, 2018.
International Search Report (PCT/ISA/210) dated Feb. 2, 2016, for PCT/JP2015/081235, with an English translation.
International Search Report and English translation (Form PCT/ISA/210) for Application No. PCT/JP2015/081237, dated Feb. 2, 2016.

(56) References Cited

OTHER PUBLICATIONS

Japanese Office Action dated Jun. 5, 2018 issued in Japanese Patent Application No. 2016-557817.
Korean Notice of Allowance for Application No. 10-2017-7010984, dated Aug. 1, 2018, with English language translation.
Notice of Allowability dated Jun. 27, 2018 for U.S. Appl. No. 15/520,502.
Office Action for TW 104136602 dated May 25, 2016.
Taiwanese Office Action and Search Report for Application No. 104136603, dated Aug. 11, 2016, with an English Translation of the Search Report.
U.S. Notice of Allowance, dated Sep. 19, 2018, for U.S. Appl. No. 15/520,502.
U.S. Office Action, dated Apr. 18, 2019, for U.S. Appl. No. 15/522,409.
U.S. Office Action, dated Jan. 4, 2018, for U.S. Appl. No. 15/520,502.
Written Opinion of the International Searching Authority (Form PCT/ISA/237) for Application No. PCT/JP2015/081237, dated Feb. 2, 2016, with an English translation.
Written Opinion of the International Searching Authority (PCT/ISA/237), dated Feb. 2, 2016, for International Application No. PCT/JP2015/081235, with an English translation.
Indian Office Action for Indian Application No. 201717014417, dated Mar. 18, 2019, with English translation.
U.S. Office Action for U.S. Appl. No. 15/522,243, dated Aug. 27, 2019.

* cited by examiner

HOT-DIP GALVANIZED STEEL SHEET

TECHNICAL FIELD OF THE INVENTION

The present invention relates to a hot-dip galvanized steel sheet excellent in plating adhesion.

Priority is claimed on Japanese Patent Application No. 2014-225398, filed on Nov. 5, 2014, the content of which is incorporated herein by reference.

RELATED ART

There has been an increasing demand for high-strengthening of steel sheets mainly used for automotive frame members. In order for these high strength steel sheets to obtain high strength and excellent formability, an alloy element which is represented by Si or Mn and contributes to the improvement of strength is generally added. However, the alloy element which is represented by Si or Mn has an effect of deteriorating plating adhesion.

Since an automotive steel sheet is generally used outdoors, it is usually required for the steel sheet to have excellent corrosion resistance.

In uses for automotive outside sheets and the like, the peripheral part of a sheet is usually subjected to severe bending (hem bending) by press working. Not only in uses for the automotive outside sheets but also in other uses, a sheet is subjected to severe bending by press working, hole expansion working, or the like to be used in many cases. In the case of subjecting a conventional hot-dip galvanized steel sheet to severe bending, hole expansion working, or the like, the plated layer is sometimes peeled off from the base steel sheet in the worked part. When the plated layer is peeled off from the base steel sheet as described above, there is a problem that the corrosion resistance of the peeled part is lost and the base steel sheet is corroded and rusted at an early stage. In addition, even when the plated layer is not peeled off, the adhesion between the plated layer and the base steel sheet is lost, even small voids are formed in the area in which the adhesion is lost to cause external air or moisture to enter the voids, and thus a function of corrosion resistance by the plated layer is lost. As a result, as described above, corrosion and rusting occurs in the base steel sheet at an early stage.

In view of such problems, for a high strength steel sheet for uses in which such severe bending or the like is performed, there has been a strong desire for developing a plated steel sheet including a hot-dip galvanized layer excellent in adhesion of the plated layer with the base steel sheet.

In order to enhance the adhesion of a plated layer, for example, as represented by Patent Documents 1 to 3, methods of forming oxides inside a steel sheet and reducing the amount of oxides at an interface between the base metal and a plated layer that causes plating peeling are proposed. However, in such a case of forming an oxide on the surface of the steel sheet, carbon in the surface of the steel sheet is bound to oxygen to be gasified. As a result, carbon is released from the steel sheet and thus the strength of the region from which the carbon is released is significantly decreased in some cases. In the case in which the strength of the surface of the steel sheet is decreased, there is a concern that fatigue resistance, which strongly depends on the properties of the surface part, is deteriorated and thus fatigue strength is significantly decreased.

Alternatively, in order to enhance the adhesion of a plated layer, in Patent Document 4, a method of enhancing plating adhesion by reforming the surface of a base steel sheet in such a manner that steps are performed by adding new annealing step and pickling step before a normal annealing step, is proposed. However, in the method described in Patent Document 4, the number of steps is increased as compared to a normal method of producing a high strength plated steel sheet, and thus there is a problem in costs.

Further, in Patent Document 5, a method of enhancing plating adhesion by removing carbon from the surface part of a base steel sheet is proposed. However, in the method described in Patent Document 5, the strength of the region from which carbon is removed is significantly decreased. Therefore, there is a concern that fatigue resistance, which strongly depends on the properties of the surface part, is deteriorated and thus fatigue strength is significantly decreased in the method described in Patent Document 5.

In Patent Documents 6 and 7, there are disclosed steel sheets in which the amounts of Mn, Al, and Si in a plated layer are controlled to be within a suitable range and plating adhesion is improved. For the steel sheets described in Patent Documents 6 and 7, it is required to control the amounts of elements in the plated layer with high accuracy at the time of production, which applies a great industrial load and causes a problem in costs.

In Patent Document 8, a high strength steel sheet in which the microstructure of the steel sheet is formed of only ferrite in order to enhance plating adhesion is proposed. However, since the microstructure is formed of only soft ferrite in the steel sheet described in Patent Document 8, sufficiently high strength cannot be obtained.

Here, a galvannealed steel sheet obtained by subjecting a steel sheet to an alloying treatment after a hot dip galvanizing treatment is widely used. The alloying treatment is a treatment of heating a plated layer to a temperature of equal to or higher than the melting point of Zn, diffusing a large amount of Fe atoms into the plated layer from the inside of a base steel sheet, and forming the plated layer into a layer mainly including a Zn—Fe alloy. For example, in Patent Documents 9, 10 and 11, galvannealed steel sheets excellent in plating adhesion are proposed. However, it is required to heat a steel sheet at a high temperature so as to sufficiently alloy the plated layer. When the steel sheet is heated to a high temperature, the microstructure inside the steel sheet is reformed and particularly coarse iron-based carbides are easily generated and the properties of the steel sheet deteriorate. Thus, this case is not preferable.

In Patent Document 12, as a base steel sheet, a hot-dip galvanized steel sheet including one or more selected from the group consisting of Si, Mn and Al is disclosed. In Patent Document 12, the control of the temperature at which the base steel sheet enters a plating bath in the production step is described. In addition, in Patent Document 12, a hot-dip galvanized steel sheet excellent in plating adhesion and spot weldability in which the area fraction of the cross section of the alloy layer formed at the interface between the base steel sheet and the plated layer is determined is disclosed.

In Patent Document 12, it is disclosed that when a steel sheet in which Si and Mn oxides are present in the surface enters a hot dip galvanizing bath, a large amount of non-plating in which the steel sheet is not plated with zinc is generated. However, in Patent Document 12, a technology for reducing the amounts of Si and Mn oxides until plating is started is not disclosed. In addition, in Patent Document 12, the temperature at which the base steel sheet enters a plating bath is set to be higher than the temperature of the hot dip galvanizing bath. Although the temperature varies depending on the Al content in the hot dip galvanizing bath, the temperature at which the base steel sheet enters a plating bath is set to be at least 4° C. higher than temperature of the hot dip galvanizing bath and to be at most 28° C. higher than temperature of the hot dip galvanizing bath. Therefore, in Patent Document 12, regarding the stability of the bath temperature, uniformity in the properties of the product is not sufficient in some cases.

PRIOR ART DOCUMENT

Patent Document

[Patent Document 1] Japanese Unexamined Patent Application, First Publication No. 2008-019465
[Patent Document 2] Japanese Unexamined Patent Application, First Publication No. 2005-060742
[Patent Document 3] Japanese Unexamined Patent Application, First Publication No. H9-176815
[Patent Document 4] Japanese Unexamined Patent Application, First Publication No. 2001-026853
[Patent Document 5] Japanese Unexamined Patent Application, First
[Patent Document 6] Japanese Unexamined Patent Application, First Publication No. 2003-055751
[Patent Document 7] Japanese Unexamined Patent Application, First Publication No. 2003-096541
[Patent Document 8] Japanese Unexamined Patent Application, First Publication No. 2005-200750
[Patent Document 9] Japanese Unexamined Patent Application, First Publication No. H11-140587
[Patent Document 10] Japanese Unexamined Patent Application, First Publication No. 2001-303226
[Patent Document 11] Japanese Unexamined Patent Application, First Publication No. 2005-060743
[Patent Document 12] Published Japanese Translation No. 2013-541645 of the PCT International Publication

DISCLOSURE OF THE INVENTION

Problems to be Solved by the Invention

In consideration of the above circumstances, an object of the present invention is to provide a hot-dip galvanized steel sheet excellent in strength, ductility, hole expansibility, spot weldability and plating adhesion.

Means for Solving the Problem

The present inventors have conducted intensive investigations for obtaining a hot-dip galvanized steel sheet excellent in plating adhesion. As a result, the present inventors have found that plating peeling is suppressed by forming a $\zeta$ phase ($FeZn_{13}$) in a plated layer and incorporating a coarse oxide, which acts as a fracture origin, in the inside thereof. By the above method, a hot-dip galvanized steel sheet excellent in plating adhesion can be obtained without subjecting the plating layer to an alloying treatment.

The present invention has been completed based on the findings and embodiments thereof are as follows.

(1) A hot-dip galvanized steel sheet comprising: a base steel sheet; and a hot-dip galvanized layer formed on at least one surface of a base steel sheet,
in which the hot-dip galvanized layer includes Fe in a content of more than 0% to 5% or less, Al in a content of more than 0% to 1.0% or less, and columnar grains formed by a $\zeta$ phase on a surface of the steel sheet, further, 20% or more of an entire interface between the hot-dip galvanized layer and the base steel sheet is coated with the $\zeta$ phase, and a ratio of an interface formed between $\zeta$ grains in which coarse oxides are present among $\zeta$ grains and the base steel sheet with respect to the entire interface between the $\zeta$ phase and the base steel sheet in the hot-dip galvanized layer is 50% or less,
the base steel sheet includes a chemical composition which satisfies, % by mass,
C: 0.040% to 0.400%,
Si: 0.05% to 2.50%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%, and
Si+0.7Al≥0.30 (in the expression, element symbols represent the content (% by mass) of each element), with a remainder of Fe and unavoidable impurities,
the base steel sheet has a refined layer in direct contact with the interface between the base steel sheet and the hot-dip galvanized layer, an average thickness of the refined layer is 0.1 to 5.0 μm, an average grain size of ferrite in the refined layer is 0.1 to 3.0 μm, one or two or more of oxides of Si and Mn are contained in the refined layer, and a maximum size of the oxide is 0.01 to 0.4 μm, and
a volume fraction of residual austenite in a range of ⅛ thickness to ⅜ thickness centered at a position of ¼ thickness from the surface of the base steel sheet is 1% or more.

(2) The hot-dip galvanized steel sheet according to (1), in which a plated amount on one surface of the base steel sheet in the hot-dip galvanized layer is 10 g/m² or more and 100 g/m² or less.

(3) The hot-dip galvanized steel sheet according to (1) or (2),
in which the base steel sheet further contains, % by mass, one or two or more selected from
Ti: 0.001% to 0.150%,
Nb: 0.001% to 0.100%, and
V: 0.001% to 0.300%.

(4) The hot-dip galvanized steel sheet according to any one of (1) to (3),
in which the base steel sheet further contains, % by mass, one or two or more selected from
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

(5) The hot-dip galvanized steel sheet according to any one of (1) to (4),
in which the base steel sheet further contains, % by mass, one or two or more selected from Ca, Ce, Mg, Zr, La, and REM in a total amount of 0.0001% to 0.0100%.

Effects of the Invention

According to the embodiment of the present invention, it is possible to provide a hot-dip galvanized steel sheet excellent in strength, ductility, hole expansibility, spot weldability, and plating adhesion.

EMBODIMENTS OF THE INVENTION

Figure 1:
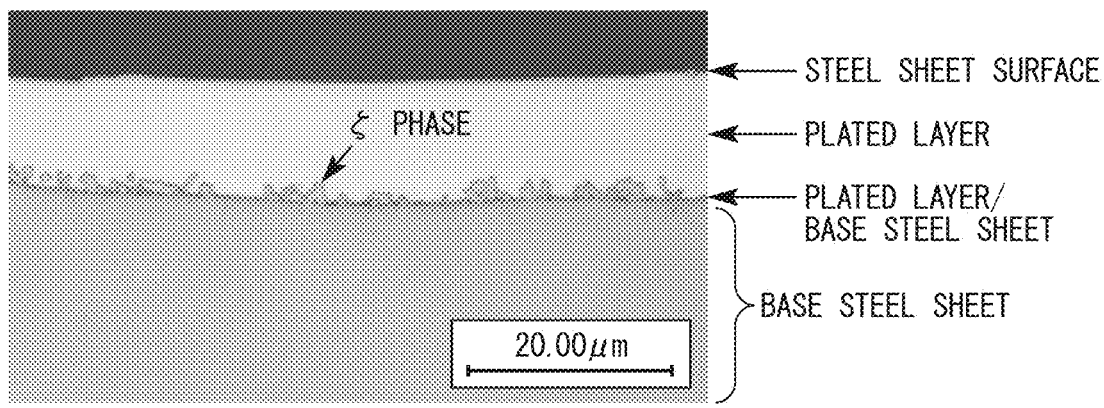
FIG. 1 is a scanning electron microscope (SEM) micrograph showing the cross section of the vicinity of an area including an interface between a hot-dip galvanized layer and a base steel sheet in the cross section of a hot-dip galvanized steel sheet according to an embodiment.

A hot-dip galvanized steel sheet according to the present invention includes a base steel sheet (hereinafter, also referred to as a steel sheet simply) and a hot-dip galvanized layer formed on at least one surface of the steel sheet (hereinafter, also referred to as a plated layer simply).

The plated layer has a Fe content of more than 0% to 5% or less and an Al content of more than 0% to 1.0% or less, and includes columnar grains formed of a ζ phase. In the plated layer, 20% or more of the entire interface between the plated layer and the base steel sheet is covered with the ζ phase, the ratio of the interface formed between the ζ grain and the base steel sheet where coarse oxides are present in the interface between the ζ phase and the base steel sheet is 50% or less.

First, the zinc-plated layer constituting the hot-dip galvanized steel sheet according to the embodiment of the embodiment of the present invention will be described. The term "%" in the following description means "% by mass".

(Plated Layer)

In the embodiment of the present invention, the hot-dip galvanized layer has a Fe content of more than 0% to 5.0% or less and an Al content of more than 0% to 1.0% or less. Further, the hot-dip galvanized layer may contain one or two or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM or one or two or more of these elements may be mixed in the hot-dip galvanized layer. Even when the hot-dip galvanized layer contains one or two or more of these elements or one or two or more of these elements are mixed in the hot-dip galvanized layer as described above, the effects of the present invention are not deteriorated and there is sometimes a preferable case in which the corrosion resistance and the workability are improved depending on the content of the element.

In addition, in the embodiment of the present invention, the hot-dip galvanized layer includes columnar grains formed of a ζ phase and 20% or more of the entire interface between the plated layer and the base steel sheet is covered with the ζ phase.

Further, it is preferable that the plated amount of the hot-dip galvanized layer on one surface of the base steel sheet is 10 g/m$^2$ or more and 100 g/m$^2$ or less.

[Fe Content in Hot-Dip Galvanized Layer: More Than 0% to 5.0% or Less]

When the Fe content in the hot-dip galvanized layer becomes higher, the plating adhesion is deteriorated and thus it is required that the Fe content is 5.0% or less. In order to further enhance the plating adhesion, the Fe content in the plated layer is preferably 4.0% or less and more preferably 3% or less. The lower limit of the Fe content in the plated layer is more than 0%. When the Fe content is less than 0.5%, the amount of ζ phase required to enhance adhesion is not sufficiently obtained in some cases. Therefore, the Fe content in the plated layer is preferably 0.5% or more and more preferably 1.0% or more.

[Al Content in Hot-Dip Galvanized Layer: More Than 0% to 1.0% or Less]

When the Al content in the hot-dip galvanized layer becomes higher, the plating adhesion is deteriorated and thus it is required that the Al content is 1.0% or less. In order to further enhance the plating adhesion, the Al content in the plated layer is preferably 0.8% or less and more preferably 0.5% or less. The lower limit of the Al content in the plated layer is more than 0%. In order to set the Al content to less than 0.01%, it is required that the concentration of Al in a plating bath is lowered extremely. When the concentration of Al in a plating bath is lowered extremely, the alloying of the plated layer excessively proceeds and thus the Fe content in the plated layer is increased so that the plating adhesion is deteriorated. For this reason, the Al content in the plated layer is preferably 0.01% or more. From this viewpoint, the Al content in the plated layer is more preferably 0.05% or more.

Furthermore, the hot-dip galvanized layer may contain one or two or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM or one or two or more of these elements are mixed in the hot-dip galvanized layer. Even when the hot-dip galvanized layer contains one or two or more of these elements or one or two or more of these elements are mixed in the hot-dip galvanized layer as described above, the effects of the present invention are not deteriorated and there is sometimes a preferable case in which the corrosion resistance and the workability are improved depending on the content of the element.

[ζ N Phase]

FIG. 1 is a scanning electron microscope (SEM) micrograph showing the cross section of the hot-dip galvanized steel sheet according to the embodiment. As shown in FIG. 1, the hot-dip galvanized layer of the present invention includes columnar grains formed of a ζ phase (FeZn$_{13}$) of an alloy of Fe and Zn. Particularly, the ratio of the interface of the ζ phase in contact with the base steel sheet is 20% or more in the entire interface between the plated layer and the base steel sheet. Accordingly, coarse oxides including Si and/or Mn, which acts as the origin of peeling, and having a major axis of 0.2 μm or more are incorporated into the ζ phase from the surface of the base steel sheet. This makes the coarse oxides hardly work as a fracture origin and thus the adhesion of the plated layer is improved. From this viewpoint, the ratio of the interface between the ζ phase and the base steel sheet with respect to the entire interface between the plated layer and the base steel sheet is preferably 25% or more and more preferably 30% or more. The upper limit of the ratio of the interface between the ζ phase and the base steel sheet with respect to the entire interface between the plated layer and the base steel sheet is not particularly limited and may be 100%. When the major axis of the oxides including Si and/or Mn is 0.2 μm or more, cracking started from the oxides becomes remarkable and when major axis of the oxides is less than 0.2 μm, the oxides hardly work as an origin of cracking. This is because a degree of stress concentration varies depending on the size of the oxide at the time of deformation of the hot-dip galvanized steel sheet. Specifically, as the size of the oxides increases (the major axis becomes longer), stress is more easily concentrated at the time of deformation and the plated layer is more easily peeled off.

On the other hand, when the coarse oxides including Si and/or Mn is not incorporated into the ζ phase and the coarse oxides are present at the interface between the ζ phase and the base steel sheet, the effect of improving plating adhesion by the ζ phase cannot be sufficiently obtained and is not preferable. For this reason, the ratio of the interface between ζ grains (coarse oxide-containing ζ grains) in which coarse oxides are present among the crystals of ζ phase grains) and the base steel sheet is 50% or less with respect to the entire interface between the ζ phase and the base steel sheet. In the case in which the ratio of the interface between the coarse oxide-containing ζ grain and the base steel sheet is 50% or less, the amount of the oxides including Si and/or Mn, which is not incorporated into the ζ phase and is present on the surface is sufficiently reduced. The ratio of the interface between the coarse oxide-containing ζ grain and the base steel sheet is preferably 35% or less with respect to the entire interface between the ζ phase and the base steel sheet. The smaller amount of the coarse oxides having a major axis of 0.2 μm or more at the interface between the ζ phase and the base steel sheet, the more preferable. In the entire interface between the ζ phase and the base steel sheet, the ratio of the interface formed between the coarse oxide-containing ζ grain and the base steel sheet is most preferably 0%.

In addition, the hot-dip galvanized layer may include a δ1 phase ($FeZn_7$). However, in order to increase the fraction of the δ1 phase, the base steel sheet is required to be heated to alloy the plated layer after the base steel sheet is immersed in the plating bath, and the tensile properties of the base steel sheet are deteriorated due to heating. From this view point, it is preferable that the fraction of the δ1 phase is small. Particularly, the ratio of the interface of the δ1 phase in contact with the base steel sheet is preferably 20% or less in the entire interface between the plated layer and the base steel sheet.

In the present invention, the ratio of the interface between the ζ phase and the base steel sheet with respect to the entire interface between the plated layer and the base steel sheet and the ratio of the interface between the δ1 phase and the base steel sheet with respect to the entire interface between the plated layer and the base steel sheet can be obtained as follows.

That is, a thickness cross section parallel to the rolling direction of the base steel sheet is set as an observed section and a sample is collected from the hot-dip galvanized steel sheet. The observed section is subjected to mirror polishing and observation is performed until the total length L of the observed interfaces between the plated layer and the base steel sheet reaches 200 μm or more by using a field emission scanning electron microscope (FE-SEM). When observation is performed until the total length L of the interfaces reaches 200 μm or more, observation may be performed in one thickness cross section until L reaches 200 μm or more or observation may be performed in a plurality of thickness cross sections until L reaches 200 μm or more.

In the same visual field as the visual field in which L is observed, grains having a columnar shape have the ζ phase or the δ1 phase and the total length L1 of the interfaces between the ζ phase and the δ1 phase and the base steel sheet is measured. Subsequently, in the same visual field as the visual field in which L1 is observed, high resolution crystal orientation analysis is performed according to EBSD (Electron Bach-scattering Diffraction) method using a FE-SEM to identify the δ1 phase. Thus, the total length L2 of the interfaces between the δ1 phase and the base steel sheet is obtained.

(L1−L2)/L is considered as the ratio of the interface between the ζ phase and the base steel sheet in the entire interface between the plated layer and the base steel sheet.

In the same manner, L2/L is considered as the ratio of the interface between the δ1 phase and the base steel sheet in the entire interface between the plated layer and the base steel sheet.

The ζ phase and the δ1 phase may be identified according to methods other than the above EBSD method. For example, the ζ phase and the δ1 phase may be determined based on a difference in amount of Zn by mapping the Zn element in the plated layer using a field emission electron probe microanalyser (FE-EPMA).

In addition, the ratio of the interface between the grains in which coarse oxides are present (coarse oxide-containing ζ grains) among the crystals of ζ (ζ grains) and the base steel sheet is obtained as follows. That is, in the same visual field as the visual field in which L is observed, the interface between the ζ phase and the base steel sheet is observed and ζ grains in which coarse oxides having a major axis of 0.2 μm or more are present (coarse oxide-containing ζ grains) is obtained at the interface between the ζ phase and the base steel sheet. The oxides present at the interface between the ζ phase of the plated layer and the base steel sheet appear to be darker than the surroundings in a SEM backscattered electron (BSE) image. Therefore, whether or not oxides are present at the interface between the ζ phase of the plated layer and the base steel sheet is determined by observing a SEM backscattered electron (BSE) image in the same visual field as the visual field in which L is observed based on a difference in brightness between the oxides and the surroundings. In addition, the major axis of each of the determined oxides on the observed section is measured and oxides having a major axis of 0.2 μm or more are determined as coarse oxides. Then, the length of the interface between the coarse oxide-containing grains and the base steel sheet is obtained and the total length L of the interfaces thereof is obtained. The ratio of the interface formed between the coarse oxide-containing ζ grains and the base steel sheet in the entire interface between the ζ phase and the base steel sheet is calculated by obtaining L/(L1−L2).

In order to make the ζ phase appear to be clear, the observed section of the sample may be subjected to mirror polishing and then the observed section may be corroded using a corrosive liquid such as nital.

[Plated Amount of Hot-Dip Galvanizing: 10 to 100 $g/m^2$]

When the plated amount of the hot-dip galvanized layer on one surface of the base steel sheet is small, there is a concern that sufficient corrosion resistance may not be obtained. For this reason, the plated amount of the plated layer on one surface of the base steel sheet is preferably 10 $g/m^2$ or more. From the viewpoint of corrosion resistance, the plated amount is more preferably 20 $g/m^2$ or more and even more preferably 30 $g/m^2$ or more. On the other hand, when the plated amount of the plated layer is large, the wear of electrodes is significant at the time of performing spot welding and there is a concern of causing reduction in a weld nugget diameter or deterioration in welded joint strength at the time of continuously performing spot welding. Therefore, the plated amount of the plated layer is preferably 100 $g/m^2$ or less. From the viewpoint of continuous weldability, the plated amount is more preferably 93 $g/m^2$ or less and even more preferably 85 $g/m^2$ or less.

The hot-dip galvanized steel sheet of the present invention includes the plated layer and the base steel sheet has a refined layer shown below.

The refined later is a region in which the average grain size of ferrite present in the outermost layer is ½ or less of the average grain size of the ferrite in the lower layer thereof. The boundary at which the average grain size of the ferrite in the refined layer is greater than ½ of the average grain size of the ferrite in the lower layer thereof is defined as a boundary between the refined later and the lower layer thereof.

The refined layer is in direct contact with the interface between the base steel sheet and the hot-dip galvanized layer. The average thickness of the refined layer is 0.1 to 5.0 µm. The average grain size of the ferrite in the refined layer is 0.1 to 3.0 µm. The refined layer contains one or two or more of oxides of Si and Mn and the maximum size of the oxide is 0.01 to 0.4 µm.

When the average thickness of the refined layer is 0.1 µm or more, crack generation or extension is suppressed at the time of working the hot-dip galvanized steel sheet. Therefore, the average thickness of the refined layer is 0.1 µm or more and preferably 1.0 µm. In addition, a refined layer having an average thickness of 5.0 µm or less can be formed while suppressing excessive alloying in a plating bath. Accordingly, it is possible to prevent deterioration in plating adhesion caused by an excessive Fe content in the plated layer. For this reason, the average thickness of the refined layer is 5.0 µm or less and preferably 3.0 µm or less.

When the average grain size of the ferrite in the refined layer 0.1 µm or more, crack generation or extension is suppressed at the time of working the hot-dip galvanized steel sheet. Therefore, the average grain size of the ferrite in the refined layer is 0.1 µm or more and preferably 1.0 µm or more. In addition, when the average grain size of the ferrite in the refined layer is greater than 3.0 µm, the effect of suppressing crack generation or extension is limitative. Therefore, the average grain size of the ferrite in the refined layer is 3.0 µm or less and preferably 2.0 µm or less.

Examples of one or two or more of oxides of Si and Mn contained in the refined layer include one or two or more selected from $SiO_2$, $Mn_2SiO_4$, $MnSiO_3$, $Fe_2SiO_4$, $FeSiO_3$, and MnO.

When the maximum size of one or two or more of oxides of Si and Mn contained in the refined layer is 0.01 µm or more, the plated layer in which the formation of a $\zeta$ phase sufficiently proceeds with the formation of a refined layer can be formed. The maximum size of the oxide is preferably 0.05 µm or more. In addition, the refined layer in which the maximum size of the oxide is 0.4 µm or less can be formed while suppressing excessive alloying of the plated layer. The maximum size of the oxide is preferably 0.2 µm or less.

The average thickness of the refined layer and the average grain size of the ferrite in the refined layer are measured according to the method described below. A thickness cross section parallel to the rolling direction of the base steel sheet is set as an observed section and a sample is collected from the hot-dip galvanized steel sheet. The observed section of the sample is processed by using CP (Cross section polisher) and a backscattered electron image is observed at a magnification of 5,000 with FE-SEM (Field Emission Scanning Electron Microscopy) for measurement.

The maximum size of one or two or more of oxides of Si and Mn contained in the refined layer is measured according to the method described below. A thickness cross section parallel to the rolling direction of the base steel sheet is set as an observed section and samples are collected from the hot-dip galvanized steel sheet. The observed section of each sample is processed with FIB (Focused Ion Beam) to prepare thin film samples. Thereafter, each thin film sample is observed with FE-TEM (Field Emission Transmission Electron Microscopy) at a magnification of 30,000. Each thin film sample is observed in five visual fields and the maximum size of the diameter of the oxide measured in the whole visual field is set as the maximum size of the oxide in the thin film sample.

The chemical components (composition) of the base steel sheet constituting the hot-dip galvanized steel sheet according to the embodiment will be described below. In the following description, the term "%" means "% by mass".

[C: 0.040% to 0.400%]

C is an element to be added to enhance the strength of the base steel sheet. However, when the C content is more than 0.400%, the spot weldability is deteriorated, which is not preferable. Thus, the C content is 0.400% or less. From the viewpoint of spot weldability, the C content is preferably 0.300% or less and more preferably 0.220% or less. On the other hand, when the C content is less than 0.040%, the strength is deteriorated and thus it is difficult to secure sufficient maximum tensile strength. Thus, the C content is 0.040% or more. In order to further increase the strength, the C content is preferably 0.055% or more and more preferably 0.070% or more.

[Si: 0.05% to 2.50%]

Si is an element that suppresses formation of iron-based carbides in the base steel sheet and enhances strength and formability. However, Si is an element that makes steel brittle. When the Si content is more than 2.50%, a trouble such as cracking of a cast slab or the like easily occurs. Therefore, the Si content is 2.50% or less. Further, Si forms oxides on the surface of the base steel sheet in an annealing step to significantly impair plating adhesion. From this viewpoint, the Si content is preferably 2.00% or less and more preferably 1.60% or less. On the other hand, when the Si content is less than 0.05%, in a plating step for the hot-dip galvanized steel sheet, a large amount of coarse iron-based carbides is formed and strength and formability deteriorate. Therefore, the Si content is 0.05% or more. From the viewpoint of suppressing formation of iron-based carbides, the Si content is preferably 0.10% or more and more preferably 0.25% or more.

[Mn: 0.50% to 3.50%]

Mn is added to increase the strength by increasing the hardenability of the base steel sheet. However, when the Mn content is more than 3.50%, a coarse Mn-concentrated part is generated in the thickness central part of the base steel sheet and embrittlement easily occurs. Thus, a trouble such as cracking of a cast slab easily occurs. Therefore, the Mn content is 3.50% or less. In addition, an increase in the Mn content results in deterioration of spot weldability. For this reason, the Mn content is preferably 3.00% or less and more preferably 2.80% or less. On the other hand, when the Mn content is less than 0.50%, a large amount of soft structure during cooling after annealing is formed and thus it is difficult to secure a sufficiently high maximum tensile strength. Accordingly, the Mn content is 0.50% or more. In order to further enhance strength, the Mn content is preferably 0.80% or more and more preferably 1.00% or more.

[P: 0.0001% to 0.1000%]

P is an element that makes steel brittle and when the P content is more than 0.1000%, a trouble such as cracking of a cast slab easily occurs. Therefore, the P content is 0.1000% or less. In addition, P is an element that causes embrittlement of a molten part by spot welding, and the P content is preferably 0.0400% or less and more preferably 0.0200% or less in order to obtain sufficient welded joint strength. On the other hand, a P content of less than 0.0001% results in a greatly increased production cost. Thus, the P content is 0.0001% or more and preferably 0.0010% or more.

[S: 0.0001% to 0.0100%]

S is an element that is bounded to Mn and forms coarse MnS and formability such as ductility, stretch flangeability and bendability deteriorates. Therefore, the S content is 0.0100% or less. In addition, S is an element that deteriorates spot weldability. Therefore, the S content is preferably 0.0060% or less and more preferably 0.0035% or less. On the other hand, a S content of less than 0.0001% results in a greatly increased production cost. Therefore, the S content is 0.0001% or more, preferably 0.0005% or more, and more preferably 0.0010% or more.

[Al: 0.001% to 1.500%]

Al is an element that makes steel brittle. When the Al content is more than 1.500%, a trouble such as cracking of a cast slab easily occurs and thus the Al content is 1.500% or less. In addition, when the Al content is increased, spot weldability is deteriorated and thus the Al content is preferably 1.200% or less and more preferably 1.000% or less. On the other hand, even when the lower limit of the Al content is not particularly limited, the effects of the present invention are exhibited. Al is an unavoidable impurity present in the raw material in a very small amount and an Al content of less than 0.001% results in a greatly increased production cost. Therefore, the Al content is 0.001% or more. In addition, Al is an element that that is effective as a deoxidation material but in order to obtain a sufficient deoxidation effect, the Al content is preferably 0.010% or more.

[N: 0.0001% to 0.0100%]

Since N is an element that forms a coarse nitride and deteriorates formability such as ductility, stretch flangeability and bendability, the amount of N added is preferably reduced. When the N content is more than 0.0100%, deterioration in formability is significant and thus the upper limit of the N content is 0.0100%. In addition, an excessive amount of N causes generation of blowholes at the time of welding and the lower the content thereof is the better it is. From this viewpoint, the N content is preferably 0.0070% or less and more preferably 0.0050% or less. On the other hand, even when the lower limit of the N content is not particularly limited, the effects of the present invention are exhibited. However, an N content of less than 0.0001% results in a greatly increased production cost. Therefore, the lower limit of the N content is 0.0001% or more. The N content is preferably 0.0003% or more and more preferably 0.0005% or more.

[O: 0.0001% to 0.0100%]

Since O forms an oxide and deteriorates formability such as ductility, stretch flangeability and bendability, the content thereof is preferably reduced. When the O content is more than 0.0100%, deterioration in formability is significant and thus the upper limit of the upper limit of the O content is 0.0100%. Further, the O content is preferably 0.0050% or less and more preferably 0.0030% or less. Even when the lower limit of the O content is not particularly limited, the effects of the present invention are exhibited. However, an O content of less than 0.0001% results in a greatly increased production cost. Therefore, the lower limit thereof is 0.0001%. The O content is preferably 0.0003% or more and more preferably 0.0005% or more.

[Si+0.7Al≥0.30]

Si and Al are elements that suppress formation of carbide with bainitic transformation. In order to obtain residual austenite, it is preferable to add a predetermined amount or more of Si and/or Al. From this viewpoint, it is required that the amount of Si added and the amount of Al added satisfy the following Expression 2. The value of the left side (Si+0.7Al) of the following Expression 2 is preferably 0.45 or more and more preferably 0.70 or more.

$$Si+0.7Al \geq 0.30 \quad \text{(Expression 2)}$$

In Expression 2, each of Si and Al represents the amount [% by mass] of each element added.

Further, the following elements may be optionally added to the base steel sheet of the hot-dip galvanized steel sheet according to the embodiment of the present invention.

Specifically, the base steel sheet may contain one or two or more selected from Ti: 0.001% to 0.150%, Nb: 0.001% to 0.100%, and V: 0.001% to 0.300%, in addition to the above chemical components.

[Ti: 0.001% to 0.150%]

Ti is an element that contributes to increasing the strength of the base steel sheet by precipitate strengthening, fine grain strengthening due to suppression of ferrite grain growth, and dislocation strengthening through suppression of recrystallization. However, when the Ti content is more than 0.150%, the amount of precipitated carbonitrides is increased formability deteriorates. Thus, the Ti content is preferably 0.150% or less. In addition, from the viewpoint of formability, the Ti content is more preferably 0.080% or less. On the other hand, even when the lower limit of the Ti content is not particularly limited, the effects of the present invention are exhibited. In order to sufficiently obtain the effect of high-strengthening by adding Ti, the Ti content is preferably 0.001% or more. In order to achieve higher strength of the base steel sheet, the Ti content is more preferably 0.010% or more.

[Nb: 0.001% to 0.100%]

Nb is an element that contributes to increasing the strength of the base steel sheet by precipitate strengthening, fine grain strengthening due to suppression of ferrite grain growth, and dislocation strengthening through suppression of recrystallization. However, when the Nb content is more than 0.100%, the amount of precipitated carbonitrides is increased and formability deteriorates. Thus, the Nb content is more preferably 0.100% or less. From the viewpoint of formability, the Nb content is more preferably 0.060% or less. On the other hand, even when the lower limit of Nb content is not particularly limited, the effects of the present invention are exhibited. In order to obtain a sufficiently obtain the effect of high-strengthening by adding Nb, the Nb content is preferably 0.001% or more. In order to achieve higher strength of the base steel sheet, the Nb content is more preferably 0.005% or more.

[V: 0.001% to 0.300%]

V is an element that contributes to increasing the strength of the base steel sheet by precipitate strengthening, fine grain strengthening due to suppression of ferrite grain growth, and dislocation strengthening through suppression of recrystallization. However, when the V content is more than 0.300%, the amount of precipitated carbonitrides is increased and formability deteriorates. Therefore, the V content is preferably 0.300% or less and more preferably 0.200% or less. On the other hand, even when the lower limit of the V content is not particularly limited, the effects of the present invention are exhibited. In order to sufficiently obtain the effect of high-strengthening by adding V, the V content is preferably 0.001% or more and more preferably 0.010% or more.

In addition, the base steel sheet according to the embodiment may contain one or two or more selected from Cr: 0.01 to 2.00%, Ni: 0.01% to 2.00%, Cu: 0.01% to 2.00%, Mo: 0.01% to 2.00%, B: 0.0001% to 0.0100%, and W: 0.01% to 2.00%.

[Cr: 0.01% to 2.00%]

Cr is an element that suppresses phase transformation at a high temperature and is effective for high-strengthening and may be added instead of part of C and/or Mn. However, when the Cr content is more than 2.00%, hot workability is impaired and productivity deteriorates. Thus, the Cr content is preferably 2.00% or less and more preferably 1.20% or less. On the other hand, even when the lower limit of the Cr content is not particularly limited, the effects of the present invention are exhibited. However, in order to sufficiently obtain the effect of high-strengthening by adding Cr, the Cr content is preferably 0.01% or more and more preferably 0.10% or more.

[Ni: 0.01% to 2.00%]

Ni is an element that suppresses phase transformation at a high temperature and is effective for high-strengthening and may be added instead of part of C and/or Mn. However, when a Ni content is more than 2.00%, weldability is impaired. Thus, the Ni content is preferably 2.00% or less and more preferably 1.20% or less. On the other hand, even when the lower limit of the Ni content is not particularly limited, the effects of the present invention are exhibited. In order to sufficiently obtain the effect of high-strengthening by adding Ni, the Ni content is preferably 0.01% or more and more preferably 0.10% or more.

[Cu: 0.01% to 2.00%]

Cu is an element that that exists as fine particles in steel to thereby enhance strength and can be added instead of part of C and/or Mn. However, when the Cu content is more than 2.00%, weldability is impaired. Thus, the Cu content is preferably 2.00% or less and more preferably 1.20% or less. On the other hand, even when the lower limit of the Cu content is not particularly limited, the effects of the present invention are exhibited. In order to sufficiently obtain the effect of high-strengthening by adding Cu, the Cu content is preferably 0.01% or more and more preferably 0.10% or more.

[Mo: 0.01% to 2.00%]

Mo is an element that suppresses phase transformation at a high temperature and is effective for high-strengthening and may be added instead of part of C and/or Mn. However, when the Mo content is more than 2.00%, hot workability is impaired and productivity deteriorates. Thus, the Mo content is preferably 2.00% or less and more preferably 1.20% or less. On the other hand, even when the lower limit of the Mo content is not particularly limited, the effects of the present invention are exhibited. In order to sufficiently obtain the effect of high-strengthening by adding Mo, the Mo content is preferably 0.01% or more and more preferably 0.05% or more.

[B: 0.0001% to 0.0100%]

B is an element that suppresses phase transformation at a high temperature and is effective for high-strengthening and may be added instead of part of C and/or Mn. However, when the B content is more than 0.0100%, hot workability is impaired and productivity deteriorates. Thus, the B content is preferably 0.0100% or less. From the viewpoint of productivity, the B content is more preferably 0.0050% or less. On the other hand, even when the lower limit of the B content is not particularly limited, the effects of the present invention are exhibited. In order to sufficiently obtain the effect of high-strengthening by adding B, the B content is preferably 0.0001% or more. In order to achieve further high-strengthening, the B content is more preferably 0.0005% or more.

[W: 0.01% to 2.00%]

W is an element that suppresses phase transformation at a high temperature and is effective for high-strengthening and may be added instead of part of C and/or Mn. However, when the W content is more than 2.00%, hot workability is impaired and productivity deteriorates. Thus, the W content is preferably 2.00% or less and more preferably 1.20% or less. On the other hand, even when the lower limit of the W content is not particularly limited, the effects of the present invention are exhibited. In order to sufficiently obtain the effect of high-strengthening by adding W, the W content is preferably 0.01% or more and more preferably 0.10% or more.

The base steel sheet in the hot-dip galvanized steel sheet according to the embodiment of the present invention may further contain, as another elements, one or two or more of Ca, Ce, Mg, Zr, La, and REM in a total amount of 0.0001% to 0.0100%. The reasons for adding these elements are as follows.

Note that REM stands for Rare Earth Metal and refers to an element belonging to the lanthanoid series. In this embodiment, REM or Ce is often added in misch metal and may contain elements of the lanthanoid series other than La and Ce in a complex form. The effects of the present invention are exhibited even when elements of the lanthanoid series other than La and Ce are contained in the slab as inevitable impurities. Further, the effects of the present invention are exhibited even when metals La and Ce are added to the slab.

Ca, Ce, Mg, Zr, La, and REM are elements effective for improving formability, and one or two or more of these elements can be added to the slab. However, when the total content of one or two or more of Ca, Ce, Mg, Zr, La, and REM is more than 0.0100%, there is a concern of ductility being impaired. Therefore, the total content of the respective elements is preferably 0.0100% or less and more preferably 0.0070% or less. On the other hand, even when the lower limit of the content of one or two or more of Ca, Ce, Mg, Zr, La, and REM is not particularly limited, the effects of the present invention are exhibited. In order to sufficiently obtaining the effect of improving the formability of the base steel sheet, the total content of one or two or more of the respective elements is preferably 0.0001% or more. From the viewpoint of formability, the total content of one or two or more of Ca, Ce, Mg, Zr, La, and REM is more preferably 0.0010% or more.

In the chemical components of the base steel sheet of the plated steel sheet according to the embodiment, a remainder other than the above-described respective elements includes Fe and unavoidable impurities. Incidentally, a very small amount of each of Ti, Nb, V, Cr, Ni, Cu, Mo, B, and W described above being less than the above-described lower limit value is allowed to be contained as an impurity. In addition, regarding Ca, Ce, Mg, Zr, La, and REM, a minute amount of them being less than the above-described lower limit value of the total content of them is allowed to be contained as an impurity.

(Microstructure)

Next, the microstructure of the base steel sheet of the hot-dip galvanized steel sheet according to the embodiment of the present invention will be described.

[Residual Austenite]

The base steel sheet of the hot-dip galvanized steel sheet according to the embodiment of the present invention includes residual austenite. The residual austenite is a structure for greatly improving a balance between strength and ductility. When the volume fraction of the residual austenite within a range of ⅛ thickness to ⅜ thickness of which the center is at the position of ¼ thickness from the surface of the base steel sheet is less than 1%, the effect of improving a balance between strength and ductility is weak. Therefore, the volume fraction of the residual austenite is 1% or more. In order to improve a balance between strength and ductility, the volume fraction of the residual austenite is preferably 3% or more and more preferably 5% or more. On the other hand, in order to obtain a large amount of residual austenite, it is required to significantly increase the amount of C to be added and as a result, there is a concern of deterioration in weldability due to a large amount of C. Therefore, the volume fraction of the residual austenite is preferably 25% or less. In addition, the residual austenite is transformed into hard martensite with deformation and this martensite works as a fracture origin so that stretch flangeability is deteriorated. Thus, the volume fraction of the residual austenite is more preferably 20% or less.

The base steel sheet of the hot-dip galvanized steel sheet according to the embodiment of the present invention may have a microstructure formed of one or two or more of granular ferrite, needle-like ferrite, unrecrystallized ferrite, pearlite, bainite, bainitic ferrite, martensite, tempered martensite, and coarse cementite, in addition to the residual austenite. For the base steel sheet, the details of the volume fraction of each phase and each structure, structure size, and arrangement can be appropriately selected to obtain properties according to the applications of the hot-dip galvanized steel sheet.

The volume fraction of each structure contained in the base steel sheet of the hot-dip galvanized steel sheet according to the embodiment of the present invention can be measured by the method, for example described below.

The volume fraction of the residual austenite included in the structure of the base steel sheet of the hot-dip galvanized steel sheet according to the embodiment is evaluated according to an X-ray diffraction method. Within a range of ⅛ thickness to ⅜ thickness of the thickness from the surface of the sheet, a surface parallel to the sheet surface is mirror finished and the area fraction of FCC iron is measured according to an X-ray diffraction method. The measured area fraction is used as the volume fraction of the residual austenite.

The volume fraction of each of ferrite, bainitic ferrite, bainite, tempered martensite, fresh martensite, pearlite, and coarse cementite included in the structure of the base steel sheet of the hot-dip galvanized steel sheet according to the embodiment is calculated according to the method described below. The thickness cross section parallel to the rolling direction of the base steel sheet is set as an observed section and a sample is collected. The observed section of the sample is polished and etched with nital. The range of ⅛ thickness to ⅜ thickness centered at the position of ¼ of the thickness from the surface of the base steel sheet is observed with a field emission scanning electron microscope (FE-SEM) to measure the area fractions of the structures and these area fractions can be considered as the volume fractions of the respective structures.

In addition, in the hot-dip galvanized steel sheet according to the embodiment, the thickness of the base steel sheet is not particularly limited but from the viewpoint of flatness of the hot-dip galvanized steel sheet and controllability at the time of cooling, the thickness of the base steel sheet is suitably within a range of 0.6 mm or more and less than 5.0 mm.

(Method of Producing Hot-Dip Galvanized Steel Sheet)

Next, the method of producing the hot-dip galvanized steel sheet according to the embodiment will be described in detail.

The method of producing the plated steel sheet according to the embodiment includes an annealing step, a plating step, and a cooling step after the plating step, and a bainitic transformation treatment for obtaining residual austenite, which will be described later, is performed between the annealing step and the plating step and/or during the cooling step after the plating step.

The annealing step is a step of heating a base steel sheet to 750° C. or higher at an average heating rate of 1.0° C./second in a range of 600° C. to 750° C. The plating step is a step of hot-dip galvanizing the steel sheet surface by immersing the base steel sheet in a zinc plating bath under the conditions of a steel sheet temperature of 440° C. to 480° C. and an amount of effective Al of 0.050% to 0.180% by mass in the plating bath when the steel sheet enters the plating bath having a plating bath temperature of 450° C. to 470° C., to form a plated layer. In the cooling step after the plating step, a cooling process of cooling the steel sheet to 350° C. after the plating step satisfies the following Expression (1), which will be described later.

In order to produce the hot-dip galvanized steel sheet according to the embodiment of the present invention, first, a base steel sheet is produced.

The base steel sheet is produced by casting a slab to which alloy elements are added according to the properties, hot-rolling the slab, and cold-rolling the slab.

Hereinafter, each production step will be described in detail.

[Casting Step]

First, a slab to be supplied to hot rolling is cast. The chemical components (composition) of the slab are preferably the above-described components. For the slab to be supplied to hot rolling, a continuous casting slab or a slab produced by a thin slab caster or the like can be used.

[Hot Rolling Step]

In the hot rolling step, in order to suppress anisotropy of crystal orientation caused by casting, the heating temperature of the slab is preferably 1,080° C. or higher. The heating temperature of the slab is more preferably 1,150° C. or higher. On the other hand, the upper limit of the heating temperature of the slab is not particularly limited. In order to heat the slab at higher than 1,300° C., a large amount of energy needs to be applied, which causes a significant increase in the production cost. Thus, the heating temperature of the slab is preferably 1,300° C. or lower.

After heating the slab, hot rolling is performed. When the temperature when the hot rolling is completed (rolling completion temperature) is lower than 850° C., the rolling reaction force is high and thus it is difficult to stably obtain a predetermined thickness. Therefore, the temperature when the hot rolling is completed is preferably 850° C. or higher and more preferably 870° C. or higher. On the other hand, in order to set the temperature when the hot rolling is completed to be higher than 980° C., in the step from the completion of heating of the slab to the completion of hot rolling, a device for heating the steel sheet is necessary and a high cost is required. Therefore, the temperature when the hot rolling is completed is preferably 980° C. or lower and more preferably 960° C. or lower.

Next, the hot-rolled steel sheet which has been subjected to hot rolling is coiled as a coil. The average cooling rate in the cooling process from the hot rolling to the coiling is preferably 10° C./second or more. This is because when transformation proceeds at a lower temperature, the grain size of the hot-rolled steel sheet is made fine and the effective grain size of the base steel, sheet after cold rolling and annealing is made fine.

The coiling temperature of the hot-rolled steel sheet is preferably 350° C. or higher and 750° C. or lower. This is because in the microstructure of the hot-rolled steel sheet, pearlite and/or coarse cementite having a major axis of 1 μm or more is formed in a dispersed manner, strain introduced by cold rolling is localized, and reverse transformation to austenite having various crystal orientations occurs in the annealing step. Thus, the effective crystal orientation of the base steel sheet after annealing is refined. When the coiling temperature is lower than 350° C., pearlite and/or coarse cementite may not be formed and thus this case is not preferable. In addition, in order to easily perform cold rolling by decreasing the strength of the hot-rolled steel sheet, the coiling temperature is more preferably increased to 450° C. or higher. On the other hand, when the coiling temperature is higher than 750° C., pearlite and ferrite are formed in a belt shape long in the rolling direction, and effective grains of the base steel sheet generated from the ferrite part after cold rolling and annealing tend to extend in the rolling direction and be coarse, which is not preferable. In addition, in order to refine the grain size of the effective grains of the base steel sheet after annealing, the coiling temperature is more preferably decreased to 680° C. or lower.

Next, pickling of the hot-rolled steel sheet produced in the above-described manner is performed. The pickling is performed for removing oxides on the surface of the hot-rolled steel sheet. Thus, the pickling is important to improve plating adhesion of the base steel sheet. The pickling may be performed at once or a plurality of times separately.

[Cold Rolling Step]

Next, the hot-rolled steel sheet after pickling is subjected to cold rolling to obtain a cold-rolled steel sheet.

In the cold rolling, when the total rolling reduction is more than 85%, the ductility of the steel sheet is impaired and a risk of breaking of the steel sheet during the cold rolling becomes higher. Therefore, the total rolling reduction is preferably 85% or less. From this viewpoint, the total rolling reduction is more preferably 75% or less and even more preferably 70% or less. The lower limit of the total rolling reduction in the cold rolling step is not particularly limited. When the total rolling reduction is less than 0.05%, the shape of the base steel sheet is not uniform and plating adheres unevenly, so that an external appearance of the steel sheet is impaired. Therefore, the total rolling reduction is preferably 0.05% or more and more preferably 0.10% or more. The cold rolling is preferably performed in a plurality of passes, but any number of passes of the cold rolling and any rolling reduction distribution to each pass are applicable.

When the total rolling reduction in the cold rolling is within a range of more than 10% and less than 20%, recrystallization does not progress sufficiently in the following annealing step and coarse grains in which malleability is lost by including a large amount of dislocations remain near the surface, and bendability and fatigue resistance properties may be deteriorated in some cases. In order to avoid this, it is effective to make malleability remain by reducing the total rolling reduction and reducing accumulation of dislocations to the grains. Alternatively, it is also effective to turn the processed structure into recrystallized grains having a small amount of accumulation of dislocations inside by reducing the total rolling reduction and making recrystallization sufficiently proceed in the annealing step. From the viewpoint of reducing the accumulation of dislocations to the grains, the total rolling reduction in the cold rolling is preferably 10% or less and more preferably 5.0% or less. On the other hand, in order to make recrystallization sufficiently proceed in the annealing step, the total rolling reduction is preferably 20% or more and more preferably 30% or more.

[Annealing Step]

In the embodiment of the present invention, the cold-rolled steel sheet is subjected to annealing. In the embodiment of the present invention, a continuous annealing and plating line having a preheating zone, a reduction zone, and a plating zone is preferably used. While performing the annealing process, the steel sheet is allowed to pass though the preheating zone and the reduction zone and before the steel sheet reaches the plating zone, the annealing step is completed. Then, the plating step is preferably performed in the plating zone.

As described above, in the case of using a continuous annealing and plating line in the annealing step and the plating step, for example, the method described below is preferably used.

The heating rate in the annealing step is related to the progress of decarburization in the steel sheet surface part through the treatment time in the preheating zone. When the heating rate in the annealing step is low, the steel sheet is exposed to an oxidation atmosphere in the preheating zone for a long period of time and thus decarburization proceeds in the steel sheet surface part. In addition, when the heating rate is too low, oxidation of the steel sheet proceeds and coarse oxides are formed inside the steel sheet in some cases. Particularly, the heating rate at 600° C. to 750° C. is important and in order to avoid excessive decarburization and oxidation in the steel sheet surface part, the average heating rate during the heating is 1.0° C./second or more. In order to avoid decarburization in the steel sheet surface, the average heating temperature at 600° C. to 750° C. is preferably 1.5° C./second or more and more preferably 2.0° C./second or more. The average heating temperature at 600° C. to 750° C. is preferably 50° C./second or less to secure the treatment time in the preheating zone to promote ζ phase formation. When the average heating rate is 50° C./second or less, a plated layer in which the ratio of the interface between the ζ phase and the base steel sheet in the entire interface between the plated layer and the base steel sheet is larger is obtained. In order to sufficiently promote ζ phase formation, the average heating rate is more preferably 10° C./second or less.

In the preheating zone, the steel sheet surface part is subjected to an oxidation treatment for forming a Fe oxide coating film having an appropriate thickness. At this time, the steel sheet is allowed to pass through the preheating zone in which the air ratio in the mixed gas of air and fuel gas used for a preheating burner, which will be described below, is 0.7 or more, while heating the steel sheet to a steel sheet temperature of 400° C. to 800° C.

The term "air ratio" is a ratio between "the volume of air included in the mixed gas per unit volume" and "the volume of air which is theoretically required to cause complete combustion of fuel gas contained in the mixed gas per unit volume", and is represented by the following expression.

Air ratio=[volume of air included in the mixed gas per unit volume (m$^3$)]/[volume of air which is theoretically required to cause complete combustion of fuel gas contained in the mixed gas per unit volume (m$^3$)]}

In the embodiment, the base steel sheet which is allowed to pass through the preheating zone is heated under the above conditions to form a Fe oxide coating film (oxide) having a thickness of 0.01 to 5.0 μm on the surface part of the base steel sheet. The Fe oxide coating film (oxide) formed on the steel sheet surface is reduced in the reduction zone and becomes a surface excellent in plating adhesion.

In the case in which the air ratio is more than 1.2 and too high, excessive Fe oxide coating film is formed on the steel sheet surface part and after reduction, the decarburized layer becomes excessively thick. Accordingly, the air ratio is preferably 1.2 or less and more preferably 1.1 or less. In the case in which air ratio is less than 0.7 and is too low, a predetermined oxide cannot be obtained. Thus, the air ratio is 0.7 or more and preferably 0.8 or more.

When the steel sheet temperature for allowing the steel sheet to pass through the preheating zone is lower than 400° C., a sufficient oxide film cannot be formed. Accordingly, the steel sheet temperature for allowing the steel sheet to pass through the preheating zone (preheating completion temperature) is 400° C. or higher and preferably 600° C. or higher. On the other hand, when the steel sheet temperature for allowing the steel sheet to pass through the preheating zone is a high temperature of higher than 800° C., reduction cannot be performed in the next reduction zone and coarse oxides including Si and/or Mn are formed in the steel sheet surface part. Accordingly, the steel sheet temperature for allowing the steel sheet to pass through the preheating zone is 800° C. or lower and preferably 750° C. or lower.

The maximum heating temperature in the annealing step is an important factor for controlling the fraction of the microstructure related to the formability of the steel sheet to be within a predetermined range. When the maximum heating temperature is low, a large amount of coarse iron-based carbides is left unmelted in the steel and thus formability is deteriorated. In order to sufficiently solid-dissolve the iron-based carbides to enhance formability, the maximum heating temperature is 750° C. or higher. Particularly, in order to obtain residual austenite, it is required that the maximum heating temperature is (Ac1+50)° C. or higher. The upper limit of the maximum heating temperature is not particularly limited but from the viewpoint of plating adhesion, the maximum heating temperature is preferably 950° C. or lower and more preferably 900° C. or lower for reducing oxides on the surface of the base steel sheet.

The Ac1 point of the steel sheet is a starting point of austenite reverse transformation. Specifically, the Ac1 point is obtained by cutting off a small piece from the steel sheet after hot rolling, heating the piece to 1,200° C. at 10° C./second, and measuring the amount of volume expansion during heating.

The temperature reaches the maximum heating temperature in the annealing step (750° C. or higher) in the reduction zone. In the reduction zone, the thin Fe oxide coating film formed on the steel sheet surface in the preheating zone is reduced to enhance plating adhesion. Therefore, a ratio between a water vapor partial pressure $P(H_2O)$ and a hydrogen partial pressure $P(H_2)$, $P(H_2O)/P(H_2)$, in the atmosphere in the reduction zone is 0.0001 to 2.00. When $P(H_2O)/P(H_2)$ is less than 0.0001, Si and/or Mn oxides which act as a plating peeling origin are formed on the outermost layer. On the other hand, when the $P(H_2O)/P(H_2)$ is more than 2.00, refinement excessively proceeds in the steel sheet surface and alloying of the plated layer excessively proceeds. Thus, plating adhesion is deteriorated. Further, when the $P(H_2O)/P(H_2)$ is more than 3.00, decarburization excessively proceeds and a hard phase of the base steel sheet surface is remarkably reduced. From this viewpoint, $P(H_2O)/P(H_2)$ is preferably within a range of 0.002 to 1.50 and more preferably within a range of 0.005 to 1.20.

As described above, when $P(H_2O)/P(H_2)$ in the reduction zone is 0.0001 to 2.00, Si and/or Mn oxides which act as a plating peeling origin are not formed on the outermost layer and fine Si and/or Mn oxides having a maximum size of 0.01 to 0.4 μm are formed inside the steel sheet surface. The fine Si and/or Mn oxides suppress the growth of Fe recrystallization during annealing. In addition, water vapor in the reduction atmosphere causes the base metal surface to be decarburized and thus the base metal surface after annealing is turned into ferrite. As a result, on the surface of the base metal after annealing, a refined layer having an average thickness of 0.1 to 5.0 μm and having a ferrite having an average grain size of 0.1 to 3.0 μm, and containing Si and/or Mn oxides having a maximum size of 0.01 to 0.4 μm is formed.

In the annealing step, at a cooling step before the plating step after the temperature reaches the maximum heating temperature and before the steel sheet reaches a plating bath (cooling step before plating), in order to obtain residual austenite, it is required to suppress formation of pearlite and cementite. Therefore, in the cooling step before plating, the average cooling rate from 750° C. to 700° C. is 1.0° C./second or more and further the average cooling rate from 700° C. to 500° C. is 5.0° C./second or more. Although the upper limit of the average cooling rate is not particularly provided, an excessively high average cooling rate is not preferable since a special cooling facility and a coolant which does not interfere with the plating step are required to obtain the excessively high average cooling rate. From this viewpoint, the average cooling rate in the above-described temperature range is preferably 100° C./second or less and more preferably 70° C./second or less.

Subsequent to the cooling step before plating, in order to obtain tempered martensite, in a period after the steel sheet temperature reaches 500° C. and before the steel sheet reaches a plating bath, as a martensitic transformation treatment, the steel sheet may be retained in a predetermined temperature range for a predetermined period of time. Regarding the martensitic transformation treatment temperature, a martensitic transformation starting temperature Ms point is set as an upper limit and the upper limit is more preferably (Ms point −20° C.). The lower limit in the martensitic transformation treatment is preferably 50° C. and the lower limit is more preferably 100° C. In addition, the martensitic transformation treatment time is preferably 1 second to 100 seconds and more preferably 10 seconds to 60 seconds. The martensite obtained in the martensitic transformation treatment enters a plating bath at a high temperature in the plating step and then is changed into tempered martensite.

The Ms point is calculated by the following expression.

Ms Point [° C.]=541−474 C/(1−VF)−15Si−35Mn−17Cr−17Ni+19Al

In the above expression, VF represents the volume fraction of ferrite, and each of C, Si, Mn, Cr, Ni, and Al represents the amount [% by mass] of each element added.

It is difficult to directly measure the volume fraction of ferrite during production. Therefore, when the Ms point is determined in the present invention, a small piece is cut off from the cold-rolled steel sheet before the steel sheet is allowed to pass through the continuous annealing and plating line. The small piece is annealed at the same temperature as in the case in which the small piece is allowed to pass through the continuous annealing and plating line and a change in the volume of the ferrite of the small piece is measured so that a numerical value calculated using the result is used as the volume fraction VF of the ferrite.

Further, after the cooling step before plating, in order to obtain residual austenite, as a bainitic transformation treatment, the steel sheet may be retained at a temperature range of 250° C. to 500° C. for a predetermined period of time.

The bainitic transformation treatment may be performed between the annealing step and the plating step, in the cooling step before plating, or in both steps.

It is required that the sum of the retaining periods of the bainitic transformation treatment that is performed between the annealing step and the plating step and in the cooling step before plating is 15 seconds or longer and 500 seconds or shorter. When the sum of the retaining periods is 15 seconds or longer, bainitic transformation sufficiently proceeds and a sufficient amount of residual austenite can be obtained. The sum of the retaining periods is preferably 25 seconds or longer. On the other hand, when the sum of the retaining periods is more than 500 seconds, pearlite and/or coarse cementite is formed. Therefore, the sum of the retaining periods is 500 seconds or shorter and preferably 300 seconds or shorter.

In the case in which the bainitic transformation treatment is performed between the annealing step and the plating step, when the bainitic transformation treatment temperature is higher than 500° C., pearlite and/or coarse cementite is formed and residual austenite cannot be obtained. Therefore, the bainitic transformation treatment temperature is 500° C. or lower. In order to promote carbon concentration to austenite with bainitic transformation, the bainitic transformation treatment temperature is preferably 485° C. or lower and more preferably 470° C. or lower. On the other hand, when the bainitic transformation treatment temperature is lower than 250° C., bainitic transformation does not sufficiently proceed and residual austenite cannot be obtained. Therefore, the bainitic transformation treatment temperature is 250° C. or higher. In order to effectively proceed bainitic transformation, the bainitic transformation treatment temperature is preferably 300° C. or higher and more preferably 340° C. or higher.

After the cooling step before plating, in the case in which both the bainitic transformation treatment and the martensitic transformation treatment are performed, regarding the treatment order, the martensitic transformation treatment is performed before the bainitic transformation treatment.

[Plating Step]

Next, the base steel sheet obtained as described above is immersed in a plating bath.

The plating bath mainly includes zinc and has a composition in which the amount of effective Al, which is a value obtained by subtracting the total amount of Fe from the total amount of Al in the plating bath, is 0.050 to 0.180% by mass. When the amount of effective al in the plating bath is less than 0.050%, the entering of Fe into the plated layer excessively proceeds to impair plating adhesion. Thus, it is required that the amount of effective Al is 0.050% or more. From this viewpoint, the amount of effective Al in the plating bath is preferably 0.065% or more and more preferably 0.070% or more. On the other hand, when the amount of effective Al in the plating bath is more than 0.180%, Al-based oxides are formed at the boundary between the base steel sheet and the plated layer and the movement of Fe and Zn atoms is inhibited at the same boundary. Thus, ζ phase formation is suppressed and plating adhesion is significantly deteriorated. From this viewpoint, it is required that the amount of effective Al in the plating bath is 0.180% or less and the amount of effective Al is preferably 0.150% or less and more preferably 0.135% or less.

One or two or more elements of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM may be mixed in the plating bath and there is a preferable case in which the corrosion resistance or workability of the hot-dip galvanized layer is improved according to the content of each element or the like.

In addition, the temperature of the plating bath is 450° C. to 470° C. When the temperature of the plating bath is lower than 450° C., the viscosity of the plating bath is excessively increased and thus it is difficult to control the thickness of the plated layer so that the external appearance of the hot-dip galvanized steel sheet is impaired. Accordingly, the temperature of the plating bath is 450° C. or higher and preferably 455° C. or higher. On the other hand, when the temperature of the plating bath is higher than 470° C., a large amount of fumes is generated, and it is difficult to realize safe production, so that the temperature of the plating bath is 470° C. or lower and preferably 465° C. or lower.

In addition, the steel sheet temperature when the base steel sheet enters the plating bath is lower than 440° C., it is required to give a large quantity of heat to the plating bath to stabilize the temperature of the plating bath at 450° C. or higher, which is practically inappropriate. On the other hand, when the steel sheet temperature when the base steel sheet enters in the plating bath is higher than 480° C., it is required to introduce a facility of removing a large quantity of heat from the plating bath to stabilize the temperature of the plating bath at 470° C. or lower, which is inappropriate in terms of production costs. Accordingly, in order to stabilize the temperature of the plating bath, the temperature of the base steel sheet when the base steel sheet enters the plating bath is preferably 440° C. or higher and 480° C. or lower. In addition, in order to control a ζ phase formation behavior to be appropriate, it is more preferable that the temperature when the base steel sheet enters the plating bath is controlled to 450° C. or higher and 470° C. or lower.

The temperature of the plating bath is preferably stabilized at a temperature within a range of 450 to 470° C. When the temperature of the plating bath is not stabilized, the ζ phase in the plating bath becomes not uniform, which causes nonuniformity in the external appearance and adhesion of the plated layer. In order to stabilize the temperature of the plating bath, it is preferable that the steel sheet temperature when the steel sheet enters the plating bath is substantially coincident with the temperature of the plating bath. Specifically, due to the limit of temperature controllability of an actual production facility, the steel sheet temperature when the steel sheet enters the plating bath is preferably controlled to be within a range of the temperature of the plating bath ±4° C. and more preferably controlled to be within a range of the temperature of the plating bath ±2° C.

In order to have an appropriate plated amount after immersing the steel sheet in the plating bath, an excessive amount of zinc on the surface is preferably removed by blowing a high pressure gas mainly including nitrogen onto the steel sheet surface.

[Cooling Step After Plating]

After the plating bath step, in the cooling step of cooling to room temperature after plating, a cooling treatment is controlled such that a cooling process to 350° C. satisfies the following Expression (1). In this manner, an appropriate amount of ζ phase is obtained in the plated layer.

In Expression (1), T(t) [° C.] represents a steel sheet temperature, t[second] represents the time elapsed from the time point when the steel sheet is taken out from the plating bath as a starting point, t1 [second] represents the time elapsed from the time point when the steel sheet is taken out from the plating bath as a starting point and until the steel sheet temperature reaches 350° C., and W*Al [% by mass] represents the amount of effective Al in the plating bath. In addition, ε, θ, and μ each represents constant terms, each of which is $2.62\times10^7$, $9.13\times10^3$, and $1.0\times10^{-1}$.

$$0.40 \leq \left[ \int_{t0}^{t1} \varepsilon \cdot \exp\left\{ -\frac{\theta \cdot \left(\frac{W_{Al}^*}{\mu}\right)^{0.2}}{T(t)} \right\} \cdot t dt \right]^{0.5} \leq 2.20 \qquad \text{Expression (1)}$$

The above Expression (1) is an expression related to a ζ phase formation behavior and as the value of the above Expression (1) increases, ζ phase formation proceeds in the plated layer. As the steel sheet temperature increases and the treatment time increases, the value of the above Expression (1) increases. In addition, when the amount of effective Al in the plated layer is increased, the value of the above Expression (1) is decreased and ζ phase formation is inhibited. When the steel sheet temperature is within a temperature range of 350° C. or lower, the diffusion of Fe atoms from the base steel sheet to the plated layer hardly occur and ζ phase formation is nearly stopped. Therefore, the above Expression (1) is used for calculation at a steel sheet temperature within a range of 350° C. or higher.

In the cooling step after plating which is performed after the immersing the steel sheet in the plating bath, when the value of the above Expression (1) is less than 0.40, a sufficient amount of the ζ phase is not obtained in the plated layer and plating adhesion is impaired. When the value of the above Expression (1) is 0.40 or more, ζ phase formation is sufficiently promoted and the ratio of the interface between the ζ phase and the base steel sheet in the entire interface between the hot-dip galvanized layer and the base steel sheet is 20% or more. In addition, when the value of the above Expression (1) is 0.40 or more, the ratio of the interface formed between the ζ grains in which coarse oxides are present and the base steel sheet in the interface between the ζ phase and the base steel sheet is 50% or less. Accordingly, in order to obtain sufficient plating adhesion, it is required that the cooling treatment is controlled such that the value of the above Expression (1) is 0.40 or more. In order to further enhance plating adhesion, it is preferable that the cooling treatment is controlled such that the value of the above Expression (1) is 0.50 or more, and it is more preferable that the cooling treatment is controlled such that the value of the above Expression (1) is 0.60 or more. On the other hand, when the value of the above Expression (1) in the cooling treatment is excessively large, alloying of the plated layer proceeds and the Fe content in the plated layer is excessively increased. Thus, plating adhesion is impaired. From the viewpoint, it is required that he cooling treatment is performed such that the value of the above Expression (1) is 2.20 or less. In order to further enhance plating adhesion, it is preferable that the cooling treatment is controlled such that the value of the above Expression (1) is 2.00 or less and it is more preferable that the cooling treatment is controlled such that the value of the above Expression (1) is 1.80 or less.

Here, when the temperature of the steel sheet is increased after the steel sheet is taken out from the plating bath, the value of the above Expression (1) is significantly increased and plating adhesion is deteriorated. In addition, the microstructure of the steel sheet is reformed and predetermined residual austenite cannot be obtained and strength deteriorates. Further, coarse carbides are formed and there is a concern of deterioration in formability. Therefore, the steel sheet temperature after the steel sheet is taken out from the plating bath is not allowed to be higher than the higher temperature of the steel sheet temperature before the steel sheet is immersed in the plating bath and the plating bath temperature.

On the other, as shown in a general method of producing a hot-dip galvanized steel sheet, when the steel sheet is rapidly cooled after the steel sheet is immersed in the plating bath, the value of the above Expression (1) is significantly decreased. As a result, a sufficient amount of the ζ phase is not obtained and plating adhesion is deteriorated. In order to set the value of the above Expression (1) to be within a predetermined range, for example, after the steel sheet is taken out from the plating bath, the steel sheet may be subjected to an isothermal retention treatment for a predetermined period of time and then rapidly cooled.

In addition, as long as the value of the above Expression (1) is set to be within a predetermined range, another optional temperature control may be performed. That is, as long as the temperature control for setting the value of the above Expression (1) to be within the range of the present invention, any cooling control form may be adopted. For example, a cooling form of rapidly cooling after an isothermal retention treatment may be used or a cooling form of almost constant slow cooling may be used.

In addition, a bainitic transformation treatment in which the steel sheet is retained within a temperature range of 250° C. to 350° C. to obtain residual austenite may be performed after a sufficient amount of the ζ phase is obtained in the plated layer by the cooling treatment satisfying the above Expression (1). At a bainitic transformation treatment temperature of lower than 250° C., bainitic transformation does not sufficiently proceed and a sufficient amount of residual austenite cannot be obtained. Therefore, the bainitic transformation treatment temperature is 250° C. or higher. The bainitic transformation treatment temperature is more preferably 300° C. or higher for effective progress of bainitic transformation. On the other hand, when the bainitic transformation treatment temperature is higher than 350° C., the diffusion of Fe atoms from the base steel sheet to the plated layer excessively occurs and thus plating adhesion is deteriorated. Therefore, the bainitic transformation treatment temperature is 350° C. or lower and preferably 340° C. or lower.

In order to further stabilize the residual austenite, the steel sheet may be cooled to 250° C. or lower and then a reheating treatment may be performed. The treatment temperature and the treatment time of the reheating treatment may be appropriately selected according to desired properties. However, a sufficient effect cannot be obtained at a reheating treatment temperature of lower than 250° C. Therefore, the reheating treatment temperature is preferably 250° C. or higher and more preferably 280° C. or higher. When the reheating treatment temperature is higher than 350° C., the diffusion of Fe atoms from the base steel sheet to the plated layer excessively occurs and thus plating adhesion is deteriorated. Therefore, the reheating treatment temperature is preferably 350° C. or lower and more preferably 340° C. or lower.

In addition, when the treatment time of the reheating treatment is longer than 1,000 seconds, the effect of the treatment is saturated and thus the treatment time is preferably 1,000 seconds or shorter. Further, the formation of pearlite and/or coarse cementite is suppressed and thus the reheating treatment time is more preferably 500 seconds or shorter.

The hot-dip galvanized steel sheet according to the embodiment can be produced by the above-described production method. However, the present invention is not limited to the above embodiment.

For example, in the production method of the above-described embodiment, the case in which the "cooling step after plating" in which the cooling process to 350° C. satisfies the above Expression (1) is performed after the plating step is exemplified. However, in the cooling step after plating, the cooling process to 350° C. may not satisfy the above Expression (1). In this case, in order to produce the same hot-dip galvanized steel sheet produced in the case in which the cooling process to 350° C. satisfies the above Expression (1), it is required to control the plating bath immersion time to be appropriate.

This is because ζ phase formation is promoted in the plating bath and a reaction between Si and/or Mn oxides present on the surface of the base steel sheet on which the plated layer is formed and Al in the plating bath is promoted by increasing the plating bath immersion time. Through the reaction between the oxides and Al in the plating bath, part of oxides present on the surface of the base steel sheet are reduced and the number and amount of the Si and/or Mn oxides present on the surface of the base steel sheet are reduced.

For obtaining the above effect by increasing the plating bath immersion time, it is required to set the plating bath immersion time to 3 seconds or longer, preferably 5 seconds or longer, more preferably 7 seconds or longer, and even more preferably 10 seconds or longer. When the plating bath immersion time is 10 seconds or longer, the same hot-dip galvanized steel sheet in the case in which the "cooling step after plating" in which the cooling process to 350° C. satisfies the above Expression (1) is performed is obtained. As a result, a plated layer in which the ratio of the interface between the ζ phase and the base steel sheet in the entire interface between the hot-dip galvanized layer and the base steel sheet is 20% or more and the ratio of the interface formed between the ζ grains in which coarse oxides are present and the base steel sheet in the interface between the ζ phase and the base steel sheet is 50% or less is obtained.

When the hot-dip galvanized steel sheet is produced, in the case of using the method in which the plating bath immersion time is 10 seconds or longer, the cooling process to 350° C. may not satisfy the above Expression (1) in the cooling step after plating. Accordingly, even in a hot-dip galvanized steel sheet manufacturing line in which the above-described "cooling step after plating" is not easily performed, the hot-dip galvanized steel sheet according to the embodiment can be easily produced.

The plating bath immersion time can be determined to be appropriate according to the Al content in the plating bath. The plating bath immersion time is preferably 20 seconds or shorter and more preferably 15 seconds or shorter to secure satisfactory productivity.

For example, in the embodiment of the present invention, a coating film formed of a composite oxide including a phosphorus oxide and/or phosphorus may be applied to the surface of the zinc-plated layer of the hot-dip galvanized steel sheet obtained by the above-described.

The coating film formed of a composite oxide including a phosphorus oxide and/or phosphorus can function as a lubricant when the hot-dip galvanized steel sheet is worked and can protect the zinc-plated layer formed on the surface of the base steel sheet.

Further, in the embodiment of the present invention, cold rolling may be performed on the hot-dip galvanized steel sheet cooled at room temperature at a rolling reduction of 3.00% or less for shape correction.

The method of producing the hot-dip galvanized steel sheet according to the above-described embodiment of the present invention is preferably applied to the production of a hot-dip galvanized steel sheet in which the thickness of the base steel sheet is 0.6 mm or more and less than 5.0 mm. When the thickness of the base steel sheet is less than 0.6 mm, it is difficult to keep the shape of the base steel sheet flat and the thickness is not appropriate in some cases. In addition, when the thickness of the base steel sheet is 5.0 mm or more, the control of cooling in the annealing step and the plating step may be difficult.

EXAMPLES

Examples of the present invention will be described. The conditions in the examples are just an illustration which is employed for confirming the feasibility and effects of the present invention. The present invention is not limited to this illustration of conditions. The present invention can employ various conditions so long as not deviating from the gist of the present invention and achieving the object of the present invention.

Example 1

Slabs having the chemical components (composition) shown in Tables 1 to 4 were casted, hot-rolled under the conditions (the slab heating temperature, the rolling completion temperature) for the hot rolling shown in Tables 5 and 6, cooled under the conditions (the average cooling rate from hot rolling completion to coiling, and the coiling temperature) for the hot rolling step shown in Tables 5 and 6, and thus hot-rolled steel sheets were obtained.

Thereafter, the hot-rolled steel sheets were subjected to pickling and cold rolling under the condition (rolling reduction) for the cold rolling shown in Tables 5 and 6 and thus cold-rolled steel sheets were obtained.

Next, the obtained cold-rolled steel sheets were subjected to annealing under the conditions (the air ratio in the preheating zone, the preheating completion temperature in the preheating zone, the partial pressure ratio ($P(H_2O)/P(H_2)$) between $H_2O$ and $H_2$ in the reduction atmosphere, the average heating rate in a temperature range of 600° C. to 750° C., the maximum heating temperature Tm) for the heating step in the annealing step shown in Tables 7 and 8. The preheating completion temperature of Experimental Examples 1 to 94 was within a range of 623° C. to 722° C.

Subsequently, the steel sheets were subjected to a cooling treatment under the conditions (cooling rate 1 (the average cooling rate in a temperature range of 750° C. to 700° C.), cooling rate 2 (the average cooling rate in a temperature range of 700° C. to 500° C.), the conditions for bainitic transformation treatment 1 (the treatment temperature, the treatment time), martensitic transformation treatment (the treatment temperature, the treatment time)) for the cooling step before plating shown in Tables 7 and 8. Regarding the steel sheet which had not been subjected to the bainitic transformation treatment 1 and the martensitic transformation treatment, the columns of the above conditions for the treatments were blank.

Next, the steel sheets were immersed in a zinc plating bath under the conditions (the amount of effective Al, the plating bath temperature (bath temperature), the steel sheet entering temperature, the immersion time) for the plating step shown in Tables 9 and 10 to be plated.

After the plating step, a cooling treatment was performed under the conditions (Expression (1), the conditions (the treatment temperature, the treatment time) for bainitic transformation treatment 2, the conditions (the treatment temperature, the treatment time) for the reheating treatment) for the cooling step after plating shown in Tables 9 and 10. Regarding the steel sheet which had not been subjected to the bainitic transformation treatment 2 and the reheating treatment, the columns of the conditions for the treatments were blank.

Further, cold rolling was performed under the conditions (rolling reduction) shown in Tables 9 and 10 to obtain plated steel sheets of Experimental Examples 1 to 94 and C1 to C44 (wherein the experiment was stopped in some of experimental examples).

In the obtained plated steel sheets (Experimental Examples 1 to 94 and C1 to C44), the microstructure of the base steel sheet and the plated layer were observed. The observation results of the microstructure of the base steel sheet and the plated layer are shown in Tables 11 and 12.

First, a thickness cross section parallel to the rolling direction of the base steel sheet was set as an observed section and a sample was collected from the plated steel sheet. The structure observation with a field emission scanning electron microscope (FE-SEM) and high resolution crystal orientation analysis according to an EBSD method were performed on the observed section of the sample. The microstructure in a range of ⅛ thickness to ⅜ thickness centered at the position of ¼ of the thickness from the surface of the base steel sheet was observed to identify the constructional structure. In Tables 11 and 12, F represents granular ferrite, WF represents needle-like ferrite, NRF represents unrecrystallized ferrite, P represents pearlite, θ represents coarse cementite, BF represents bainitic ferrite, B represents bainite, M represents martensite, tM represents tempered martensite, and γ represents residual austenite, respectively in the observation.

In addition, a small piece having a size of 25 mm×25 mm was collected from the plated steel sheet as a test piece. In the range of ⅛ thickness to ⅜ thickness from the surface of the thickness of the test piece, the surface parallel to the sheet surface was mirror finished and the volume fraction (γ fraction) of the residual austenite was measured by an X-ray diffraction method.

Further, a thickness cross section parallel to the rolling direction of the base steel sheet was set as an observed section and a sample was collected from the plated steel sheet. The observed section of the sample was observed with a field emission scanning electron microscope (FE-SEM) to observe the interface between the plated layer and the base steel sheet. From the result thereof, the ratio of the interface between the ζ phase and the base steel sheet in the interface between the plated layer and the base steel sheet (boundary surface occupancy ratio), the ratio of the interface between the δ1 phase and the base steel sheet in the interface between the plated layer and the base steel sheet (boundary surface occupancy ratio), and the ratio of the interface formed between the ζ grains in which coarse oxides were present and the base steel sheet in the entire interface between the ζ phase and the base steel sheet (ratio of boundary surface where oxide presents) were obtained by the above-described method.

The plated amount of the plating was obtained by melting the plated layer using a hydrochloric acid with an inhibitor and comparing the weight before and after the melting.

Further, a thickness cross section parallel to the rolling direction of the base steel sheet was set as an observed section and a sample was collected from the plated steel sheet. The average thickness of the refined layer to be in direct contact with the interface between the base steel sheet and the hot-dip galvanized layer (the average thickness of the refined layer), the average grain size of the ferrite in the refined layer (the average grain size of the ferrite), and the maximum size of one or two or more of oxides of Si and Mn in the refined layer (the maximum size of the oxide) were obtained by using the above-described measurement method. The results are shown in Tables 11 and 12.

Next, in order to investigate the properties of each plated steel sheet, a tensile test, a hole expansion test, a bending test, an adhesion evaluation test, a spot welding test, a corrosion test, a chipping property test, and a powdering property test were performed. The properties in each experimental example are shown in Tables 13 and 14.

No. 5 test pieces as described in JIS Z 2201 were cut out from the plated steel sheets to perform a tensile test according to the method described in JIS Z2241. Thus, the yield strength YS, the maximum tensile strength TS, and the total elongation El were obtained. The tensile properties were evaluated such that case in which the maximum tensile strength TS was 420 MPa or more was satisfactory.

A hole expansion test was performed according to the method described in JIS Z 2256. The ductility (total elongation) El and hole expansibility λ of formability changes according to the maximum tensile strength TS. However, the strength, the ductility and the hole expansibility in the case in which the following Expression (3) was satisfied were satisfactory.

$$TS^{1.5} \times El \times \lambda^{0.5} \geq 2.5 \times 10^6 \qquad \text{Expression (3)}$$

For plating adhesion, each plated steel sheet to which 5% uniaxial tension strain was applied was subjected to a DuPont impact test. An adhesive tape was attached to the plated steel sheet after the impact test and then peeled off. The case in which the plating was not peeled off was evaluated as pass (o) and the case in which the plating was peeled off was evaluated as fail (x). The DuPont impact test was performed by dropping a weight of 3 kg onto the steel sheet from a height of 1 m using a punching die having a radius of curvature of the front end of ½ inches.

Spot weldability was evaluated by performing a continuous dotting test. Under the condition that the diameter of the welded part is 5.3 to 5.7 times the square root of the thickness, spot welding was continuously performed 1,000 times and $d_1$ of the first dot and $d_{1000}$ of the 1,000-th dot of the diameters of the welded parts were compared to each other. The case in which $d_{1000}/d_1$ was 0.90 or more was evaluated as pass (o) and the case in which $d_{1000}/d_1$ was less than 0.90 was evaluated as fail (x).

For the evaluation of corrosion resistance, a test piece cut out from each plated steel sheet to have a size of 150×70 mm was used. The test piece was subjected to a zinc phosphate-based dipping type chemical conversion treatment and subsequently a cation electrodeposition coat of 20 μm was applied. Further, an intermediate coat of 35 μm and an upper coat of 35 μm were applied and then the rear surface and the end portion were sealed with an insulating tape. In the corrosion resistance test, CCT having one cycle of SST 6 hr→drying 4 hr→wetting 4 hr→freezing 4 hr was used. The evaluation of corrosion resistance after coating was performed such that the coated surface was cross-cut with a cutter until the cutting reached the base steel sheet and a swollen width after 60 cycles of CCT was measured. The case in which the swollen width was 3.0 mm or less was evaluated as pass (o) and the case in which the swollen width was more than 3.0 mm was evaluated as fail (x).

Chipping properties were evaluated using a test piece cut out from each plated steel sheet to have a size of 70 mm×150 mm. First, each step of formation of an automotive degreasing and chemical conversion coating film and 3-coat coating was performed on the test piece. Next, in a state in which the test piece was cooled and retained at −20° C., ten crushed stones (0.3 to 0.5 g) were vertically applied with an air pressure of 2 kgf/cm². The application of the crushed stones was repeated five times to each test piece. Then, in each test piece, 50 chipping scars in total were observed and evaluation was made based on the following criteria according to the position of the peeled interface. The case in which the peeled interface was above the plated layer (the interface between the plated layer and the chemical conversion coating film or the interface between the electrodeposition coat and the intermediate coat coating) was evaluated as (o) and the case in which even one interface peeling occurred at interface between the plated layer and the base metal was evaluated as (x).

Powdering properties were evaluated using V bending (JIS Z 2248) to evaluate the workability of the plated layer. Each plated steel sheet was cut into a size of 50×90 mm and a formed body was formed with a 1R-90° V-shaped die press to be used as a test piece. In the grooves of each test piece, tape peeling was performed. Specifically, a cellophane tape having a width of 24 mm was pressed on the bent part of the test piece and then peeled off. The part of the cellophane tape at a length of 90 mm was visually determined. The evaluation criteria were as follows. The case in which the peeling of the plated layer occurred in an area of less than 5% of the worked part area was evaluated as (o) and the case in which the peeling of the plated layer occurred in an area of more than 5% of the worked part area was evaluated as (x).

TABLE 1

| | Chemical components (% by mass) Remainder: Fe and unavoidable impurities | | | | | | | | | | | |
|---|---|---|---|---|---|---|---|---|---|---|---|---|
| | C | Si | Mn | P | S | Al | N | O | Ti | Nb | V | Remarks |
| A | 0.096 | 0.56 | 2.57 | 0.010 | 0.0020 | 0.031 | 0.0038 | 0.0011 | | | | Example |
| B | 0.081 | 0.61 | 1.91 | 0.013 | 0.0024 | 0.121 | 0.0042 | 0.0025 | | | | Example |
| C | 0.231 | 1.50 | 2.43 | 0.008 | 0.0024 | 0.058 | 0.0081 | 0.0019 | | | | Example |
| D | 0.249 | 0.41 | 2.02 | 0.004 | 0.0014 | 0.016 | 0.0030 | 0.0024 | | | | Example |
| E | 0.144 | 0.62 | 1.80 | 0.008 | 0.0007 | 0.069 | 0.0071 | 0.0014 | 0.068 | | | Example |
| F | 0.165 | 0.78 | 1.84 | 0.016 | 0.0042 | 0.022 | 0.0046 | 0.0014 | | 0.018 | | Example |
| G | 0.196 | 0.06 | 2.05 | 0.008 | 0.0016 | 1.034 | 0.0031 | 0.0009 | | | 0.179 | Example |
| I | 0.175 | 0.78 | 1.70 | 0.009 | 0.0022 | 0.057 | 0.0024 | 0.0006 | | | | Example |
| J | 0.133 | 0.60 | 3.35 | 0.020 | 0.0011 | 0.023 | 0.0044 | 0.0023 | | | | Example |
| K | 0.176 | 0.44 | 2.35 | 0.004 | 0.0008 | 0.072 | 0.0046 | 0.0019 | | | | Example |
| L | 0.138 | 0.64 | 1.66 | 0.019 | 0.0007 | 0.016 | 0.0042 | 0.0010 | | | | Example |
| N | 0.339 | 0.50 | 1.78 | 0.014 | 0.0035 | 0.037 | 0.0026 | 0.0007 | | | | Example |
| O | 0.154 | 0.75 | 3.35 | 0.019 | 0.0023 | 0.077 | 0.0008 | 0.0026 | | | | Example |
| P | 0.093 | 0.68 | 1.60 | 0.017 | 0.0016 | 0.070 | 0.0016 | 0.0029 | | | | Example |
| Q | 0.151 | 0.89 | 2.11 | 0.008 | 0.0037 | 0.052 | 0.0025 | 0.0024 | | | | Example |
| R | 0.197 | 0.49 | 1.49 | 0.010 | 0.0002 | 0.056 | 0.0047 | 0.0025 | | | | Example |
| S | 0.100 | 1.84 | 1.90 | 0.004 | 0.0006 | 0.046 | 0.0039 | 0.0024 | | | | Example |
| T | 0.209 | 0.14 | 3.05 | 0.013 | 0.0010 | 1.168 | 0.0025 | 0.0005 | 0.009 | 0.028 | | Example |
| U | 0.182 | 0.73 | 2.63 | 0.032 | 0.0033 | 0.029 | 0.0020 | 0.0027 | | | | Example |
| V | 0.109 | 1.06 | 2.90 | 0.013 | 0.0003 | 0.072 | 0.0024 | 0.0022 | 0.017 | | | Example |
| W | 0.138 | 0.37 | 0.85 | 0.011 | 0.0036 | 0.310 | 0.0020 | 0.0027 | 0.009 | 0.041 | | Example |
| X | 0.130 | 1.00 | 1.41 | 0.014 | 0.0038 | 0.027 | 0.0017 | 0.0024 | 0.017 | | | Example |
| Y | 0.147 | 0.60 | 2.53 | 0.004 | 0.0069 | 0.046 | 0.0017 | 0.0006 | | 0.026 | | Example |
| Z | 0.187 | 0.79 | 1.72 | 0.008 | 0.0015 | 0.055 | 0.0040 | 0.0031 | 0.009 | 0.006 | 0.033 | Example |
| AD | 0.090 | 2.22 | 2.09 | 0.010 | 0.0033 | 0.019 | 0.0019 | 0.0011 | | 0.019 | | Example |
| AI | 0.062 | 0.80 | 2.22 | 0.018 | 0.0023 | 0.062 | 0.0032 | 0.0026 | 0.065 | | | Example |
| AK | 0.184 | 0.48 | 2.25 | 0.003 | 0.0037 | 0.056 | 0.0032 | 0.0029 | 0.046 | 0.013 | | Example |
| AS | 0.158 | 1.40 | 1.84 | 0.018 | 0.0046 | 0.058 | 0.0046 | 0.0005 | | | | Example |
| AT | 0.108 | 0.55 | 1.21 | 0.014 | 0.0031 | 0,720 | 0.0031 | 0.0028 | | 0.044 | | Example |
| AW | 0.107 | 0.95 | 0.64 | 0.012 | 0.0009 | 0.017 | 0.0038 | 0.0016 | 0.052 | | | Example |
| BC | 0.174 | 3.25 | 1.90 | 0.020 | 0.0034 | 0.036 | 0.0037 | 0.0033 | | | | Comp.Ex. |
| BE | 0.126 | 0.68 | 3.77 | 0.019 | 0.0032 | 0.008 | 0.0052 | 0.0013 | | | | Comp.Ex. |
| BF | 0.100 | 0.53 | 1.96 | 0.137 | 0.0009 | 0.032 | 0.0037 | 0.0015 | | | | Comp.Ex. |
| BH | 0.145 | 0.97 | 1.95 | 0.010 | 0.0012 | 2.071 | 0.0007 | 0.0025 | | | | Comp.Ex. |

TABLE 2

| | Chemical components (% by mass) Remainder: Fe and unavoidable impurities | | | | | | | | | | | | |
|---|---|---|---|---|---|---|---|---|---|---|---|---|---|
| | Cr | Ni | Cu | Mo | B | W | Ca | Ce | Mg | Zr | La | REM | Si + 0.7 Al | Remarks |
| A | | | | | | | | | | | | | 0.58 | Example |
| B | | | | | | | | | | | | | 0.69 | Example |
| C | | | | | | | | | | | | | 1.54 | Example |
| D | | | | | | | | | | | | | 0.42 | Example |
| E | | | | | | | | | | | | | 0.67 | Example |
| F | | | | | | | | | | | | | 0.80 | Example |
| G | | | | | | | | | | | | | 0.78 | Example |
| I | | 0.72 | | | | | | | | | | | 0.82 | Example |
| J | | | 0.67 | | | | | | | | | | 0.61 | Example |
| K | | | | 0.20 | | | | | | | | | 0.49 | Example |

TABLE 2-continued

| | Chemical components (% by mass) Remainder: Fe and unavoidable impurities | | | | | | | | | | | | |
|---|---|---|---|---|---|---|---|---|---|---|---|---|---|
| | Cr | Ni | Cu | Mo | B | W | Ca | Ce | Mg | Zr | La | REM | Si + 0.7 Al | Remarks |
| L | | | | | 0.0010 | | | | | | | | 0.65 | Example |
| N | | | | | | | 0.0031 | | | | | | 0.52 | Example |
| O | | | | | | | | 0.0008 | | | | | 0.80 | Example |
| P | | | | | | | | | 0.0034 | | | | 0.73 | Example |
| Q | | | | | | | | | | 0.0021 | | | 0.92 | Example |
| R | | | | | | | | | | | 0.0012 | | 0.53 | Example |
| S | | | | | | | | | | | | 0.0018 | 1.87 | Example |
| T | | | | | | | | | | | | | 0.96 | Example |
| U | | 0.79 | 0.56 | | | | | | | | | | 0.75 | Example |
| V | | | | | 0.0025 | | | | | | | | 1.11 | Example |
| W | 0.63 | | | 0.03 | 0.0037 | | | | | | | | 0.59 | Example |
| X | 0.30 | | | | | | | | | | | | 1.02 | Example |
| Y | | | | | | | 0.0017 | 0.0018 | | | | | 0.63 | Example |
| Z | | | | 0.14 | 0.0004 | | 0.0004 | | | | | | 0.83 | Example |
| AD | | | | | | | | | | | | | 2.23 | Example |
| AI | | 0.40 | | | | | | | | | | | 0.84 | Example |
| AK | | | | 0.31 | | | | | | | | | 0.52 | Example |
| AS | | | | | | | | | | | | 0.0036 | 1.44 | Example |
| AT | | | | | | | | | | | | | 1.06 | Example |
| AW | 0.80 | | | 0.09 | 0.0006 | | | | | | | | 0.96 | Example |
| BC | | | | | | | | | | | | | 3.28 | Comp.Ex. |
| BE | | | | | | | | | | | | | 0.68 | Comp.Ex. |
| BF | | | | | | | | | | | | | 0.55 | Comp.Ex. |
| BH | | | | | | | | | | | | | 2.42 | Comp.Ex. |

TABLE 3

| | Chemical components (% by mass) Remainder: Fe and unavoidable impurities | | | | | | | | | | | |
|---|---|---|---|---|---|---|---|---|---|---|---|---|
| | C | Si | Mn | P | S | Al | N | O | Ti | Nb | V | Remarks |
| CA | 0.091 | 0.50 | 2.47 | 0.004 | 0.0041 | 0.091 | 0.0040 | 0.0009 | | | | Example |
| CB | 0.085 | 0.69 | 1.41 | 0.010 | 0.0022 | 0.103 | 0.0032 | 0.0005 | | | | Example |
| CC | 0.231 | 1.50 | 2.43 | 0.008 | 0.0024 | 0.058 | 0.0081 | 0.0019 | | | | Example |
| CD | 0.109 | 1.21 | 1.65 | 0.010 | 0.0024 | 0.031 | 0.0021 | 0.0005 | | | | Example |
| CE | 0.100 | 0.17 | 2.43 | 0.013 | 0.0019 | 0.072 | 0.0038 | 0.0013 | | | | Comp.Ex. |
| CF | 0.141 | 0.33 | 1.39 | 0.011 | 0.0043 | 0.003 | 0.0004 | 0.0002 | | | | Example |
| CG | 0.408 | 0.83 | 2.06 | 0.008 | 0.0032 | 0.031 | 0.0038 | 0.0006 | | | | Comp.Ex. |
| CH | 0.031 | 0.65 | 2.36 | 0.013 | 0.0020 | 0.045 | 0.0027 | 0.0002 | | | | Comp.Ex. |
| CI | 0.150 | 0.65 | 0.33 | 0.013 | 0.0023 | 0.051 | 0.0034 | 0.0015 | | | | Comp.Ex. |
| CJ | 0.099 | 0.75 | 1.90 | 0.012 | 0.0136 | 0.031 | 0.0037 | 0.0017 | | | | Comp.Ex. |
| CK | 0.102 | 0.65 | 2.45 | 0.011 | 0.0013 | 0.143 | 0.0198 | 0.0010 | | | | Comp.Ex. |
| CL | 0.155 | 0.75 | 1.73 | 0.009 | 0.0033 | 0.043 | 0.0038 | 0.0133 | | | | Comp.Ex. |

TABLE 4

| | Chemical components (% by mass) Remainder: Fe and unavoidable impurities | | | | | | | | | | | | |
|---|---|---|---|---|---|---|---|---|---|---|---|---|---|
| | Cr | Ni | Cu | Mo | B | W | Ca | Ce | Mg | Zr | La | REM | Si + 0.7 Al | Remarks |
| CA | | | | | | | | | | | | | 0.59 | Example |
| CB | | | | | | 0.38 | | | | | | | 0.79 | Example |
| CC | | | | | | | | | | | | | 1.56 | Example |
| CD | 1.10 | | | | | | | | | | | | 1.24 | Example |
| CE | | | | | | | | | | | | | 0.24 | Comp.Ex. |
| CF | | | | | | | | | | | | | 0.33 | Example |
| CG | | | | | | | | | | | | | 0.86 | Comp.Ex. |
| CH | | | | | | | | | | | | | 0.70 | Comp.Ex. |
| CI | | | | | | | | | | | | | 0.70 | Comp.Ex. |
| CJ | | | | | | | | | | | | | 0.78 | Comp.Ex. |
| CK | | | | | | | | | | | | | 0.79 | Comp.Ex. |
| CL | | | | | | | | | | | | | 0.79 | Comp.Ex. |

TABLE 5

| Experimental Example | Chemical components | Hot rolling step Slab heating temperature ° C. | Rolling completion temperature ° C. | Average cooling rate ° C./sec | Coiling temperature ° C. | Cold rolling step Rolling reduction % | Remarks |
|---|---|---|---|---|---|---|---|
| 1 | A | 1220 | 954 | 23 | 597 | 50 | Example |
| 2 | A | 1230 | 913 | 17 | 559 | 50 | Example |
| 3 | A | 1235 | 906 | 14 | 601 | 50 | Comp.Ex. |
| 4 | B | 1190 | 934 | 29 | 583 | 64 | Example |
| 5 | B | 1220 | 911 | 15 | 604 | 29 | Example |
| 6 | B | 1220 | 928 | 16 | 607 | — | Comp.Ex. |
| 7 | C | 1190 | 888 | 27 | 584 | 42 | Example |
| 9 | C | 1195 | 873 | 13 | 600 | 42 | Comp.Ex. |
| 10 | D | 1240 | 914 | 44 | 600 | 52 | Example |
| 12 | D | 1215 | 944 | 35 | 587 | 34 | Example |
| 13 | E | 1210 | 918 | 12 | 660 | 43 | Example |
| 14 | F | 1240 | 868 | 28 | 558 | 32 | Example |
| 15 | G | 1205 | 900 | 57 | 560 | 50 | Example |
| 17 | I | 1200 | 949 | 24 | 562 | 44 | Example |
| 18 | J | 1210 | 921 | 63 | 587 | 42 | Example |
| 20 | J | 1200 | 927 | 16 | 583 | 55 | Example |
| 21 | K | 1235 | 911 | 23 | 554 | 46 | Example |
| 22 | L | 1210 | 927 | 19 | 610 | 50 | Example |
| 25 | N | 1210 | 904 | 63 | 553 | 0.14 | Example |
| 26 | N | 1245 | 941 | 61 | 572 | 55 | Comp.Ex. |
| 27 | O | 1235 | 896 | 17 | 542 | 39 | Example |
| 28 | P | 1185 | 961 | 13 | 668 | 44 | Example |
| 29 | Q | 1180 | 938 | 36 | 563 | 46 | Example |
| 30 | R | 1185 | 915 | 31 | 574 | 64 | Example |
| 31 | S | 1215 | 888 | 28 | 496 | 68 | Example |
| 33 | S | 1190 | 898 | 30 | 565 | 55 | Comp.Ex. |
| 34 | T | 1195 | 899 | 18 | 614 | 65 | Example |
| 35 | T | 1210 | 894 | 56 | 566 | 89 | Comp.Ex. |
| 36 | U | 1190 | 907 | 57 | 385 | 59 | Example |
| 37 | V | 1205 | 915 | 12 | 657 | 53 | Example |
| 38 | W | 1225 | 905 | 46 | 566 | 41 | Example |
| 39 | X | 1235 | 872 | 24 | 589 | 53 | Example |
| 40 | X | 1230 | 940 | 27 | 543 | 57 | Comp.Ex. |
| 41 | Y | 1195 | 897 | 16 | 544 | 37 | Example |
| 42 | Z | 1185 | 924 | 22 | 579 | 42 | Example |
| 43 | Z | 1245 | 952 | 28 | 591 | 57 | Comp.Ex. |
| 55 | AD | 1235 | 893 | 17 | 542 | 58 | Example |
| 62 | AI | 1215 | 894 | 22 | 555 | 49 | Example |
| 65 | AK | 1235 | 899 | 20 | 597 | 3.4 | Example |
| 76 | AS | 1255 | 880 | 48 | 387 | 50 | Example |
| 78 | AT | 1190 | 947 | 17 | 670 | 42 | Example |
| 82 | AW | 1210 | 929 | 40 | 710 | 50 | Example |
| 89 | BC | Experiment stopped due to occurrence of cracking of slab during cooling | | | | | Comp.Ex. |
| 91 | BE | Experiment stopped due to occurrence of cracking of slab during heating | | | | | Comp.Ex. |
| 92 | BF | Experiment stopped due to occurrence of cracking of slab during heating | | | | | Comp.Ex. |
| 94 | BH | Experiment stopped due to occurrence of cracking of slab during cooling | | | | | Comp.Ex. |

TABLE 6

| Experimental Example | Chemical components | Hot rolling step Slab heating temperature ° C. | Rolling completion temperature ° C. | Average cooling rate ° C./sec | Coiling temperature ° C. | Cold rolling step Rolling reduction % | Remarks |
|---|---|---|---|---|---|---|---|
| C1 | CA | 1225 | 948 | 23 | 589 | 50 | Example |
| C2 | CA | 1220 | 938 | 25 | 609 | 65 | Example |
| C3 | CA | 1220 | 912 | 21 | 564 | 81 | Example |
| C4 | CA | 1205 | 950 | 20 | 604 | 50 | Comp.Ex. |
| C5 | CA | 1220 | 918 | 20 | 609 | 50 | Comp.Ex. |
| C6 | CA | 1205 | 910 | 20 | 559 | 50 | Example |
| C7 | CA | 1215 | 940 | 20 | 560 | 40 | Example |
| C8 | CA | 1225 | 928 | 21 | 598 | 50 | Comp.Ex. |
| C9 | CA | 1200 | 915 | 25 | 571 | 50 | Comp.Ex. |
| C10 | CA | 1230 | 903 | 16 | 592 | 50 | Comp.Ex. |
| C11 | CB | 1185 | 933 | 33 | 574 | 74 | Example |
| C12 | CB | 1215 | 909 | 18 | 595 | 29 | Example |
| C13 | CB | 1210 | 910 | 20 | 593 | 50 | Example |
| C14 | CB | 1180 | 933 | 23 | 547 | 50 | Example |
| C15 | CB | 1215 | 928 | 31 | 591 | 60 | Comp.Ex. |

TABLE 6-continued

| | | Hot rolling step | | | | Cold rolling step | |
|---|---|---|---|---|---|---|---|
| Experimental Example | Chemical components | Slab heating temperature °C. | Rolling completion temperature °C. | Average cooling rate °C./sec | Coiling temperature °C. | Rolling reduction % | Remarks |
| C16 | CB | 1200 | 920 | 19 | 584 | 60 | Comp.Ex. |
| C17 | CB | 1210 | 901 | 19 | 559 | 50 | Comp.Ex. |
| C18 | CB | 1230 | 821 | 17 | 605 | — | Comp.Ex. |
| C19 | CC | 1200 | 891 | 27 | 576 | 42 | Example |
| C20 | CC | 1230 | 927 | 66 | 575 | 42 | Example |
| C21 | CC | 1210 | 893 | 29 | 576 | 50 | Example |
| C22 | CC | 1220 | 904 | 21 | 249 | — | Comp.Ex. |
| C23 | CC | 1195 | 878 | 15 | 604 | 42 | Comp.Ex. |
| C24 | CC | 1205 | 900 | 25 | 590 | 50 | Comp.Ex. |
| C25 | CC | 1220 | 917 | 34 | 585 | 50 | Comp.Ex. |
| C26 | CC | 1210 | 915 | 30 | 605 | 50 | Comp.Ex. |
| C27 | CC | 1195 | 909 | 24 | 558 | 50 | Example |
| C28 | CD | 1220 | 950 | 14 | 648 | 57 | Comp.Ex. |
| C29 | CD | 1210 | 936 | 36 | 637 | 50 | Example |
| C30 | CD | 1215 | 937 | 37 | 629 | 50 | Comp.Ex. |
| C31 | CD | 1200 | 906 | 19 | 604 | 50 | Example |
| C32 | CD | 1195 | 901 | 23 | 598 | 50 | Example |
| C33 | CD | 1230 | 899 | 20 | 605 | 50 | Example |
| C34 | CE | 1200 | 885 | 30 | 550 | 50 | Comp.Ex. |
| C35 | CF | 1240 | 885 | 28 | 565 | 59 | Example |
| C36 | CF | 1220 | 896 | 24 | 567 | 59 | Example |
| C37 | CF | 1210 | 900 | 20 | 588 | 59 | Comp.Ex. |
| C38 | CG | 1215 | 906 | 30 | 598 | 47 | Comp.Ex. |
| C39 | CH | 1225 | 914 | 33 | 593 | 59 | Comp.Ex. |
| C40 | CI | 1200 | 902 | 20 | 550 | 50 | Comp.Ex. |
| C41 | CJ | 1235 | 927 | 31 | 605 | 64 | Comp.Ex. |
| C42 | CK | 1250 | 913 | 15 | 558 | 53 | Comp.Ex. |
| C43 | CL | 1185 | 894 | 30 | 568 | 53 | Comp.Ex. |
| C44 | CC | 1195 | 901 | 29 | 586 | 42 | Example |

TABLE 7

| | | Annealing step | | | | | | | | | | |
|---|---|---|---|---|---|---|---|---|---|---|---|---|
| | | Heating step | | | | | | Cooling step before plating | | | | |
| | | | | | | | | | | Bainite | Martensite | |
| Experimental Example | Chemical components | Average heating rate °C./sec | Maximum heating temperature Tm °C. | Ac1 °C. | Tm-Ac1 °C. | Pre-heating zone Air ratio | Reduction zone P(H₂O)/P(H₂) | Cooling rate 1 °C./sec | Cooling rate 2 °C./sec | Treatment temperature °C. | Treatment time sec | Treatment temperature °C. | Treatment time sec | Remarks |
| 1 | A | 2.9 | 813 | 715 | 98 | 0.9 | 0.85 | 2.0 | 33.9 | | | | | Example |
| 2 | A | 1.4 | 773 | 715 | 58 | 1.0 | 0.57 | 1.2 | 9.4 | 464 | 49 | | | Example |
| 3 | A | 4.1 | 861 | 715 | 146 | 1.0 | 0.76 | 2.3 | 23.3 | 469 | 33 | | | Comp.Ex. |
| 4 | B | 2.4 | 875 | 721 | 154 | 0.9 | 0.71 | 1.3 | 23.0 | 405 | 115 | | | Example |
| 5 | B | 1.9 | 776 | 721 | 55 | 1.0 | 0.006 | 1.7 | 23.3 | 450 | 57 | | | Example |
| 6 | B | Experiment stopped due to disablement of annealing treatment by shape defect of steel sheet | | | | | | | | | | | | Comp.Ex. |
| 7 | C | 2.4 | 807 | 751 | 56 | 1.1 | 0.63 | 2.2 | 13.5 | 473 | 52 | | | Example |
| 9 | C | 4.3 | 815 | 751 | 64 | 0.4 | 0.54 | 3.0 | 11.4 | | | | | Comp.Ex. |
| 10 | D | 4.4 | 875 | 717 | 158 | 0.9 | 0.84 | 2.4 | 12.7 | 451 | 59 | | | Example |
| 12 | D | 5.1 | 831 | 717 | 114 | 1.0 | 0.78 | 3.3 | 33.3 | 367 | 238 | 156 | 15 | Example |
| 13 | E | 3.5 | 838 | 717 | 121 | 1.0 | 0.60 | 2.2 | 30.3 | 460 | 28 | | | Example |
| 14 | F | 1.6 | 844 | 731 | 113 | 0.9 | 0.47 | 1.0 | 9.4 | 486 | 43 | | | Example |
| 15 | G | 3.4 | 868 | 765 | 103 | 0.9 | 0.47 | 1.9 | 15.2 | 433 | 39 | | | Example |
| 17 | I | 6.0 | 875 | 714 | 161 | 1.0 | 0.59 | 3.3 | 12.6 | 465 | 125 | | | Example |
| 18 | J | 2.8 | 785 | 716 | 69 | 0.9 | 0.70 | 2.2 | 11.8 | 430 | 58 | | | Example |
| 20 | J | 1.6 | 849 | 716 | 133 | 0.9 | 0.89 | 1.1 | 7.4 | 371 | 231 | | | Example |
| 21 | K | 2.9 | 849 | 712 | 137 | 1.1 | 0.72 | 2.0 | 19.3 | 327 | 86 | | | Example |
| 22 | L | 1.4 | 877 | 715 | 162 | 0.9 | 0.50 | 1.8 | 6.2 | 413 | 35 | | | Example |
| 25 | N | 2.4 | 781 | 716 | 65 | 1.1 | 0.58 | 2.0 | 15.0 | 446 | 176 | | | Example |
| 26 | N | 2.0 | 873 | 716 | 157 | 0.9 | 0.80 | 1.1 | 10.3 | 423 | 29 | | | Comp.Ex. |
| 27 | O | 2.0 | 774 | 716 | 58 | 1.1 | 0.77 | 1.9 | 18.5 | | | | | Example |
| 28 | P | 4.6 | 803 | 723 | 80 | 1.0 | 0.77 | 3.4 | 24.3 | | | | | Example |
| 29 | Q | 3.5 | 900 | 737 | 163 | 1.0 | 0.75 | 1.7 | 16.9 | 380 | 87 | | | Example |
| 30 | R | 3.1 | 789 | 733 | 56 | 1.1 | 1.00 | 2.5 | 18.7 | 447 | 29 | | | Example |
| 31 | S | 2.8 | 893 | 766 | 127 | 0.9 | 0.62 | 1.4 | 7.6 | | | | | Example |

TABLE 7-continued

| | | Annealing step | | | | | | | | | | | |
|---|---|---|---|---|---|---|---|---|---|---|---|---|---|
| | | Heating step | | | | | Cooling step before plating | | | | | | |
| | | | Maximum heating temperature Tm ° C. | | | Preheating zone Air ratio | Reduction zone P(H₂O)/ P(H₂) | | | Bainite | | Martensite | |
| Experimental Example | Chemical components | Average heating rate ° C./sec | | Ac1 ° C. | Tm-Ac1 ° C. | | | Cooling rate 1 ° C./sec | Cooling rate 2 ° C./sec | Treatment temperature ° C. | Treatment time sec | Treatment temperature ° C. | Treatment time sec | Remarks |
| 33 | S | 0.3 | 847 | 766 | 81 | 0.9 | 0.73 | 1.4 | 29.7 | 461 | 32 | | | Comp.Ex. |
| 34 | T | 4.2 | 834 | 762 | 72 | 0.9 | 0.79 | 2.7 | 26.7 | 472 | 27 | | | Example |
| 35 | T | Experiment stopped due to breaking of sheet by cold rolling | | | | | | | | | | | | Comp.Ex. |
| 36 | U | 3.3 | 844 | 710 | 134 | 1.0 | 0.57 | 2.0 | 10.5 | | | | | Example |
| 37 | V | 2.3 | 823 | 731 | 92 | 0.8 | 0.86 | 1.5 | 12.6 | 444 | 301 | | | Example |
| 38 | W | 1.3 | 814 | 761 | 53 | 0.8 | 0.73 | 1.3 | 8.9 | 389 | 22 | | | Example |
| 39 | X | 3.6 | 824 | 739 | 85 | 1.0 | 0.73 | 2.4 | 14.8 | 476 | 28 | | | Example |
| 40 | X | 3.8 | 839 | 739 | 100 | 0.9 | 2.35 | 2.0 | 10.4 | 461 | 35 | | | Comp.Ex. |
| 41 | Y | 2.6 | 774 | 718 | 56 | 1.0 | 0.51 | 2.3 | 8.7 | | | | | Example |
| 42 | Z | 2.5 | 843 | 724 | 119 | 1.0 | 0.49 | 1.5 | 12.1 | 491 | 60 | | | Example |
| 43 | Z | 2.3 | 821 | 724 | 97 | 1.5 | 0.55 | 1.5 | 10.3 | 448 | 57 | | | Comp.Ex. |
| 55 | AD | 1.2 | 830 | 775 | 55 | 1.0 | 0.48 | 1.0 | 12.1 | | | | | Example |
| 62 | AI | 2.4 | 784 | 722 | 62 | 1.0 | 0.86 | 1.3 | 28.9 | 445 | 29 | | | Example |
| 65 | AK | 2.5 | 899 | 707 | 192 | 1.0 | 1.55 | 1.2 | 18.6 | 475 | 41 | | | Example |
| 76 | AS | 3.2 | 882 | 758 | 124 | 1.0 | 0.13 | 1.7 | 13.3 | 405 | 217 | | | Example |
| 78 | AT | 3.4 | 827 | 768 | 59 | 1.0 | 0.76 | 2.2 | 30.3 | 470 | 21 | | | Example |
| 82 | AW | 2.3 | 912 | 756 | 156 | 0.9 | 1.25 | 1.1 | 10.8 | | | | | Example |
| 89 | BC | Experiment stopped due to occurrence of cracking of slab during cooling | | | | | | | | | | | | Comp.Ex. |
| 91 | BE | Experiment stopped due to occurrence of cracking of slab during heating | | | | | | | | | | | | Comp.Ex. |
| 92 | BF | Experiment stopped due to occurrence of cracking of slab during heating | | | | | | | | | | | | Comp.Ex. |
| 94 | BH | Experiment stopped due to occurrence of cracking of slab during cooling | | | | | | | | | | | | Comp.Ex. |

TABLE 8

| | | Annealing step | | | | | | | | | | | | |
|---|---|---|---|---|---|---|---|---|---|---|---|---|---|---|
| | | Heating step | | | | | | Cooling step before plating | | | | | | |
| | | | Maximum heating temperature Tm ° C. | | | Preheating zone | | | | | Bainite | | Martensite | |
| Experimental Example | Chemical components | Average heating rate ° C./sec | | Ac1 ° C. | Tm-Ac1 ° C. | Air ratio | Completion temperature ° C. | Reduction zone P(H₂O)/ P(H₂) | Cooling rate 1 ° C./sec | Cooling rate 2 ° C./sec | Treatment temperature ° C. | Treatment time sec | Treatment temperature ° C. | Treatment time sec | Remarks |
| C1 | CA | 2.9 | 803 | 685 | 118 | 0.9 | 669 | 0.85 | 12.2 | 30.9 | | | | Example |
| C2 | CA | 23.0 | 767 | 685 | 82 | 0.9 | 641 | 0.63 | 1.5 | 13.0 | 285 | 47 | | Example |
| C3 | CA | 2.0 | 783 | 685 | 98 | 1.0 | 697 | 0.59 | 1.4 | 10.4 | 464 | 48 | | Example |
| C4 | CA | 2.0 | 741 | 685 | 56 | 0.9 | 656 | 0.88 | 2.2 | 28.0 | 460 | 52 | | Comp.Ex. |
| C5 | CA | 2.5 | 810 | 685 | 125 | 0.9 | 671 | 0.81 | 0.3 | 10.3 | 427 | 72 | | Comp.Ex. |
| C6 | CA | 2.3 | 790 | 685 | 105 | 0.9 | 723 | 0.0008 | 1.5 | 12.0 | 460 | 58 | | Example |
| C7 | CA | 2.9 | 803 | 685 | 118 | 0.9 | 701 | 0.83 | 7.2 | 62.9 | 412 | 10 | | Example |
| C8 | CA | 2.5 | 810 | 685 | 125 | 0.9 | 670 | 0.80 | 2.2 | 29.0 | | | | Comp.Ex. |
| C9 | CA | 3.1 | 785 | 685 | 100 | 0.9 | 657 | 0.62 | 1.6 | 11.3 | 476 | 12 | | Comp.Ex. |
| C10 | CA | 4.1 | 861 | 685 | 176 | 1.0 | 664 | 0.76 | 2.3 | 23.3 | 469 | 33 | | Comp.Ex. |
| C11 | CB | 2.4 | 835 | 713 | 122 | 0.9 | 598 | 0.71 | 1.3 | 23.0 | 405 | 115 | | Example |
| C12 | CB | 2.0 | 781 | 713 | 68 | 0.9 | 700 | 0.004 | 2.0 | 20.0 | 465 | 68 | | Example |
| C13 | CB | 3.1 | 790 | 713 | 77 | 0.9 | 775 | 0.28 | 1.8 | 20.3 | 407 | 19 | | Example |
| C14 | CB | 2.6 | 825 | 713 | 112 | 0.9 | 716 | 0.77 | 1.5 | 18.6 | 398 | 23 | | Example |
| C15 | CB | 2.4 | 805 | 713 | 92 | 0.9 | 685 | 0.65 | 1.6 | 3.5 | 445 | 105 | | Comp.Ex. |
| C16 | CB | 2.5 | 825 | 713 | 112 | 0.8 | 685 | 0.65 | 1.2 | 25.0 | | | | Comp.Ex. |
| C17 | CB | 2.8 | 815 | 713 | 102 | 0.9 | 692 | 0.73 | 1.8 | 18.8 | 417 | 105 | | Comp.Ex. |
| C18 | CB | Experiment stopped due to disablement of cold rolling by shape defect of hot-rolled steel sheet | | | | | | | | | | | | Comp.Ex. |
| C19 | CC | 2.4 | 807 | 738 | 69 | 1.0 | 627 | 0.63 | 2.2 | 13.5 | 473 | 52 | | Example |
| C20 | CC | 2.0 | 793 | 738 | 55 | 0.9 | 739 | 0.64 | 1.5 | 43.9 | | | | Example |
| C21 | CC | 2.5 | 802 | 738 | 64 | 0.9 | 636 | 0.58 | 2.0 | 14.9 | 479 | 58 | | Example |
| C22 | CC | Experiment stopped due to breaking of steel sheet in cold rolling step | | | | | | | | | | | | Comp.Ex. |
| C23 | CC | 3.4 | 818 | 738 | 80 | 0.9 | 711 | 0.0000 | 3.0 | 12.0 | | | | Comp.Ex. |
| C24 | CC | 2.0 | 809 | 738 | 71 | 0.9 | 711 | 0.60 | 2.2 | 13.5 | | | | Comp.Ex. |
| C25 | CC | 2.0 | 801 | 738 | 63 | 0.9 | 662 | 0.60 | 2.0 | 36.2 | 555 | 74 | | Comp.Ex. |

TABLE 8-continued

| | | Annealing step | | | | | | | | | | | | |
|---|---|---|---|---|---|---|---|---|---|---|---|---|---|---|
| | | Heating step | | | | | | Cooling step before plating | | | | | | |
| | | Maximum | | | | Preheating zone | | | | Bainite | | Martensite | | |
| Experimental Example | Chemical components | Average heating rate °C./sec | heating temperature Tm °C. | Ac1 °C. | Tm-Ac1 °C. | Air ratio | Completion temperature °C. | Reduction zone P(H₂O)/P(H₂) | Cooling rate 1 °C./sec | Cooling rate 2 °C./sec | Treatment temperature °C. | Treatment time sec | Treatment temperature °C. | Treatment time sec | Remarks |
| C26 | CC | 2.3 | 799 | 738 | 61 | 0.9 | 710 | 0.59 | 3.1 | 25.6 | 235 | 52 | | | Comp.Ex. |
| C27 | CC | 1.5 | 854 | 738 | 116 | 1.0 | 715 | 0.60 | 10.7 | 49.3 | 480 | 30 | | | Example |
| C28 | CD | 2.5 | 776 | 744 | 32 | 0.8 | 652 | 0.65 | 2.1 | 12.0 | 439 | 42 | | | Comp.Ex. |
| C29 | CD | 2.5 | 806 | 744 | 62 | 0.8 | 665 | 0.68 | 1.9 | 13.3 | 438 | 59 | | | Example |
| C30 | CD | 2.5 | 810 | 744 | 66 | 0.9 | 630 | 0.65 | 2.0 | 12.8 | 470 | 7 | | | Comp.Ex. |
| C31 | CD | 2.3 | 810 | 744 | 66 | 0.8 | 637 | 0.59 | 2.5 | 20.3 | 385 | 14 | | | Example |
| C32 | CD | 2.5 | 800 | 744 | 56 | 1.0 | 647 | 0.63 | 21.9 | 22.5 | 440 | 18 | | | Example |
| C33 | CD | 2.4 | 807 | 744 | 63 | 0.9 | 708 | 0.67 | 2.1 | 13.4 | 444 | 60 | | | Example |
| C34 | CE | 3.0 | 809 | 709 | 100 | 0.9 | 633 | 0.58 | 2.2 | 16.0 | 451 | 64 | | | Comp.Ex. |
| C35 | CF | 3.0 | 800 | 706 | 94 | 1.0 | 639 | 0.60 | 2.5 | 16.3 | 453 | 64 | | | Example |
| C36 | CF | 2.7 | 804 | 706 | 98 | 1.0 | 673 | 0.63 | 2.4 | 17.0 | 458 | 58 | | | Example |
| C37 | CF | 2.9 | 801 | 706 | 95 | 1.0 | 620 | 0.62 | 2.5 | 14.0 | 465 | 743 | | | Comp.Ex. |
| C38 | CG | 2.4 | 788 | 689 | 99 | 0.9 | 687 | 0.82 | 1.5 | 14.3 | 444 | 84 | | | Comp.Ex. |
| C39 | CH | 3.7 | 839 | 704 | 135 | 1.0 | 656 | 0.78 | 2.6 | 18.1 | 471 | 73 | | | Comp.Ex. |
| C40 | CI | 2.3 | 810 | 738 | 72 | 0.8 | 619 | 0.65 | 1.8 | 24.5 | 461 | 71 | | | Comp.Ex. |
| C41 | CJ | 3.5 | 828 | 719 | 109 | 0.9 | 648 | 0.84 | 2.0 | 15.4 | 470 | 68 | | | Comp.Ex. |
| C42 | CK | 4.7 | 805 | 713 | 92 | 0.8 | 665 | 0.60 | 3.5 | 17.3 | 471 | 75 | | | Comp.Ex. |
| C43 | CL | 3.3 | 812 | 733 | 79 | 0.8 | 723 | 0.79 | 2.6 | 15.9 | 468 | 83 | | | Comp.Ex. |
| C44 | CC | 2.5 | 807 | 738 | 69 | 1.0 | 813 | 0.23 | 2.5 | 15.0 | 475 | 55 | | | Comp.Ex. |

| | Plating step | | | | Cooling step after plating | | | | Cold rolling | |
|---|---|---|---|---|---|---|---|---|---|---|
| | Plating bath | | | | | | Reheating time | | | |
| | Amount | Steel | | | Bainite | | | | | |
| Experimental Example | effective Al % by mass | Bath temperature °C. | sheet entering temperature °C. | Immersion time sec | Expression (1) | Treatment temperature °C. | Treatment time sec | Treatment temperature °C. | Treatment time sec | Rolling reduction % | Remarks |
| 1 | 0.104 | 459 | 459 | 3.0 | 0.62 | 338 | 57 | | | 0.16 | Example |
| 2 | 0.144 | 465 | 445 | 4.6 | 0.42 | | | | | 0.20 | Example |
| 3 | 0.112 | 456 | 456 | 3.0 | 0.33 | | | | | 0.23 | Comp.Ex. |
| 4 | 0.098 | 463 | 454 | 5.2 | 0.65 | | | | | 0.11 | Example |
| 5 | 0.099 | 460 | 445 | 5.2 | 0.57 | | | | | 0.12 | Example |
| 6 | Experiment stopped due to disablement of annealing treatment by shape defect of steel sheet | | | | | | | | | | Comp.Ex. |
| 9 | 0.096 | 461 | 457 | 7.4 | 8.80 | 327 | 151 | | | 0.23 | Comp.Ex. |
| 26 | 0.080 | 464 | 473 | 3.0 | 11.80 | | | | | 0.09 | Comp.Ex. |
| 33 | 0.088 | 459 | 461 | 6.4 | 14.60 | | | | | 0.18 | Comp.Ex. |
| 35 | Experiment stopped due to breaking of sheet by cold rolling | | | | | | | | | | Comp.Ex. |
| 36 | 0.086 | 460 | 465 | 4.8 | 1.19 | 326 | 264 | | | 0.25 | Example |
| 37 | 0.103 | 460 | 456 | 7.8 | 0.69 | | | | | 0.09 | Example |
| 38 | 0.090 | 458 | 463 | 3.6 | 1.24 | | | 293 | 160 | 0.05 | Example |
| 39 | 0.090 | 467 | 456 | 3.2 | 0.98 | | | | | 0.17 | Example |
| 40 | 0.093 | 456 | 462 | 4.1 | 0.87 | | | | | 0.05 | Comp.Ex. |
| 41 | 0.100 | 458 | 460 | 8.3 | 0.90 | 334 | 48 | | | 0.18 | Example |
| 42 | 0.093 | 460 | 465 | 7.6 | 1.03 | | | | | 0.14 | Example |
| 43 | 0.097 | 462 | 469 | 6.8 | 1.00 | | | | | 0.26 | Comp.Ex. |
| 55 | 0.110 | 463 | 459 | 7.8 | 0.77 | 308 | 232 | | | 0.18 | Example |
| 62 | 0.103 | 455 | 451 | 5.5 | 0.75 | | | | | 0.09 | Example |
| 65 | 0.092 | 459 | 449 | 5.9 | 0.64 | | | | | 0.10 | Example |
| 76 | 0.086 | 461 | 443 | 5.8 | 0.67 | | | | | 0.07 | Example |
| 78 | 0.099 | 466 | 456 | 9.2 | 0.72 | | | | | 0.12 | Example |
| 82 | 0.100 | 457 | 478 | 5.3 | 0.97 | 308 | 40 | | | 0.06 | Example |
| 89 | Experiment stopped due to occurrence of cracking of slab during cooling | | | | | | | | | | Comp.Ex. |
| 91 | Experiment stopped due to occurrence of cracking of slab during heating | | | | | | | | | | Comp.Ex. |
| 92 | Experiment stopped due to occurrence of cracking of slab during heating | | | | | | | | | | Comp.Ex. |
| 94 | Experiment stopped due to occurrence of cracking of slab during cooling | | | | | | | | | | Comp.Ex. |

TABLE 10

| Experimental Example | Plating step - Plating bath - Amount of effective Al % by mass | Bath temperature °C. | Steel sheet entering temperature °C. | Immersion time sec | Expression (1) | Cooling step after plating - Bainite - Treatment temperature °C. | Treatment time sec | Reheating treatment - Treatment temperature °C. | Treatment time sec | Cold rolling Rolling reduction % | Remarks |
|---|---|---|---|---|---|---|---|---|---|---|---|
| C1 | 0.104 | 459 | 459 | 9.5 | 0.62 | 338 | 57 | | | 0.16 | Example |
| C2 | 0.102 | 460 | 458 | 6.5 | 0.61 | | | | | 0.09 | Example |
| C3 | 0.103 | 460 | 457 | 5.0 | 0.60 | | | | | 0.12 | Example |
| C4 | 0.103 | 460 | 459 | 4.7 | 0.65 | | | | | 0.11 | Comp.Ex. |
| C5 | 0.104 | 462 | 459 | 3.3 | 0.68 | | | | | 0.10 | Comp.Ex. |
| C6 | 0.102 | 462 | 460 | 4.8 | 0.63 | | | | | 0.10 | Example |
| C7 | 0.131 | 467 | 463 | 3.3 | 0.52 | 342 | 38 | | | 0.06 | Example |
| C8 | 0.088 | 469 | 469 | 6.9 | 2.37 | 398 | 164 | | | 0.10 | Comp.Ex. |
| C9 | 0.102 | 460 | 460 | 6.5 | 0.62 | | | | | 0.08 | Comp.Ex. |
| C10 | 0.034 | 464 | 464 | 8.9 | 3.87 | | | | | 0.10 | Comp.Ex. |
| C11 | 0.098 | 463 | 454 | 3.7 | 0.65 | | | | | 0.11 | Example |
| C12 | 0.096 | 454 | 450 | 9.3 | 0.59 | | | | | 0.10 | Example |
| C13 | 0.098 | 455 | 453 | 6.5 | 0.60 | | | | | 0.10 | Example |
| C14 | 0.072 | 469 | 469 | 4.2 | 1.82 | | | | | 0.11 | Example |
| C15 | 0.100 | 460 | 459 | 4.8 | 0.60 | | | | | 0.11 | Comp.Ex. |
| C16 | 0.099 | 458 | 455 | 5.1 | 0.63 | 235 | 105 | | | 0.11 | Comp.Ex. |
| C17 | 0.236 | 460 | 459 | 7.9 | 0.15 | | | | | 0.10 | Comp.Ex. |
| C18 | Experiment stopped due to disablement of cold rolling by shape defect of hot-rolled steel sheet | | | | | | | | | | Comp.Ex. |
| C19 | 0.087 | 463 | 464 | 4.8 | 0.81 | | | | | 0.00 | Example |
| C20 | 0.102 | 461 | 446 | 7.3 | 0.51 | 328 | 113 | | | 0.00 | Example |
| C21 | 0.090 | 462 | 466 | 5.4 | 0.77 | | | 310 | 781 | 0.03 | Example |
| C22 | Experiment stopped due to breaking of steel sheet in cold rolling step | | | | | | | | | | Comp.Ex. |
| C23 | 0.094 | 461 | 457 | 5.7 | 0.63 | 347 | 183 | | | 0.10 | Comp.Ex. |
| C24 | 0.092 | 462 | 464 | 3.4 | 0.71 | | | | | 0.10 | Comp.Ex. |
| C25 | 0.100 | 458 | 456 | 7.1 | 0.58 | | | | | 0.10 | Comp.Ex. |
| C26 | 0.100 | 460 | 457 | 8.6 | 0.58 | | | | | 0.08 | Comp.Ex. |
| C27 | 0.067 | 468 | 467 | 8.9 | 1.73 | 336 | 26 | | | 0.05 | Example |
| C28 | 0.106 | 461 | 459 | 6.1 | 0.61 | | | | | 0.11 | Comp.Ex. |
| C29 | 0.104 | 456 | 459 | 4.0 | 0.58 | | | | | 0.11 | Example |
| C30 | 0.104 | 456 | 459 | 7.8 | 0.58 | 315 | 6 | | | 0.10 | Comp.Ex. |
| C31 | 0.106 | 465 | 464 | 4.4 | 0.70 | 347 | 9 | | | 0.11 | Example |
| C32 | 0.103 | 459 | 460 | 7.9 | 0.61 | 338 | 38 | 317 | 17 | 0.09 | Example |
| C33 | 0.162 | 456 | 459 | 8.5 | 0.43 | | | | | 0.10 | Example |
| C34 | 0.107 | 460 | 459 | 3.1 | 0.62 | | | | | 0.09 | Comp.Ex. |
| C35 | 0.091 | 462 | 459 | 4.2 | 0.55 | | | | | 0.14 | Example |
| C36 | 0.054 | 461 | 460 | 6.5 | 2.08 | | | | | 0.14 | Example |
| C37 | 0.090 | 463 | 459 | 9.3 | 0.58 | | | | | 0.10 | Comp.Ex. |
| C38 | 0.089 | 462 | 461 | 3.5 | 0.89 | | | | | 0.08 | Comp.Ex. |
| C39 | 0.121 | 466 | 476 | 7.3 | 0.91 | | | | | 0.10 | Comp.Ex. |
| C40 | 0.109 | 459 | 459 | 5.8 | 0.98 | | | | | 0.10 | Comp.Ex. |
| C41 | 0.108 | 456 | 458 | 4.7 | 0.64 | | | | | 0.10 | Comp.Ex. |
| C42 | 0.111 | 456 | 455 | 5.9 | 0.63 | | | | | 0.10 | Comp.Ex. |
| C43 | 0.120 | 456 | 455 | 4.4 | 0.78 | | | | | 0.10 | Comp.Ex. |
| C44 | 0.089 | 464 | 463 | 5.1 | 0.83 | | | | | 0.00 | Comp.Ex. |

TABLE 11

| | | | | | Plated layer | | | | | Base steel sheet | | | |
|---|---|---|---|---|---|---|---|---|---|---|---|---|---|
| | | | | | | | ζ Phase | | | | | | |
| | | | | | | | Ratio | | | | | | |
| | | Microstructure | | | | | Boundary surface occupancy ratio % | of boundary surface where oxides present % | δ1Phase Boundary surface occupancy ratio % | Plated amount g/m² | Average thickness of refined layer μm | Average grain size of ferrite phase μm | Maximum size of oxide μm |
| Experimental Example | Chemical components | Constitutional structure | γ Fraction % | Content Fe % | Content Al % | | | | | | | | | Remarks |
| 1 | A | F, BF, M, γ | 3 | 1.7 | 0.34 | 62 | 0 | 0 | 61 | 3.1 | 0.8 | 0.03 | Example |
| 2 | A | F, BF, B, M, γ | 5 | 0.8 | 0.31 | 22 | 0 | 0 | 58 | 2.7 | 0.4 | 0.1 | Example |
| 3 | A | F, BF, B, M, γ | 2 | 0.3 | 0.23 | 3 | 0 | 0 | 64 | 2.6 | 0.5 | 0.04 | Comp.Ex. |
| 4 | B | F, BF, B, γ | 6 | 1.2 | 0.31 | 37 | 0 | 0 | 72 | 3.3 | 1.2 | 0.02 | Example |
| 5 | B | F, BF, B, M, γ | 2 | 1.8 | 0.18 | 60 | 31 | 0 | 58 | 1.0 | 1.4 | 0.4 | Example |
| 6 | B | Experiment stopped due to disablement of annealing treatment by shape defect of steel sheet | | | | | | | | | | | Comp.Ex. |
| 7 | C | F, BF, γ | 8 | 2.2 | 0.18 | 71 | 0 | 0 | 48 | 2.0 | 2.4 | 0.03 | Example |
| 9 | C | F, BF, M, γ | 4 | 0.4 | 0.20 | 16 | 25 | 0 | 77 | 1.0 | 1.0 | 0.2 | Comp.Ex. |
| 10 | D | WF, BF, B, M, γ | 3 | 1.0 | 0.27 | 29 | 0 | 0 | 37 | 3.4 | 0.4 | 0.03 | Example |
| 12 | D | F, BF, B, tM, γ | 3 | 1.6 | 0.28 | 52 | 0 | 0 | 38 | 3.2 | 2.3 | 0.02 | Example |
| 13 | E | F, BF, B, M, γ | 5 | 1.9 | 0.27 | 64 | 0 | 0 | 63 | 2.8 | 0.4 | 0.1 | Example |
| 14 | F | F, BF, B, M, γ | 4 | 2.2 | 0.19 | 89 | 0 | 0 | 61 | 2.3 | 0.4 | 0.04 | Example |
| 15 | G | F, BF, γ | 8 | 3.4 | 0.23 | 94 | 0 | 0 | 35 | 4.0 | 0.7 | 0.02 | Example |
| 17 | I | F, BF, M, γ | 10 | 1.4 | 0.20 | 34 | 0 | 0 | 76 | 1.9 | 0.4 | 0.03 | Example |
| 18 | J | F, BF, B, M, γ | 4 | 1.7 | 0.22 | 45 | 0 | 0 | 45 | 2.4 | 0.3 | 0.04 | Example |
| 20 | J | BF, B, tM, M, γ | 2 | 1.6 | 0.28 | 40 | 0 | 0 | 60 | 3.2 | 0.3 | 0.04 | Example |
| 21 | K | F, B, tM, M, γ | 3 | 1.9 | 0.28 | 56 | 0 | 0 | 61 | 3.2 | 0.3 | 0.1 | Example |
| 22 | L | F, BF, tM, γ | 5 | 2.1 | 0.20 | 64 | 0 | 0 | 64 | 2.5 | 0.4 | 0.03 | Example |
| 25 | N | F, BF, B, γ | 11 | 1.5 | 0.19 | 48 | 0 | 0 | 74 | 3.0 | 0.8 | 0.03 | Example |
| 26 | N | F, WF, B, M, γ | 7 | 5.9 | 0.26 | 55 | 0 | 45 | 33 | 3.1 | 0.9 | 0.04 | Comp.Ex. |
| 27 | O | F, M, γ | 11 | 1.6 | 0.29 | 60 | 0 | 0 | 50 | 2.5 | 0.3 | 0.03 | Example |
| 28 | P | F, tM, γ | 4 | 0.7 | 0.34 | 25 | 0 | 0 | 76 | 2.6 | 1.4 | 0.02 | Example |
| 29 | Q | F, BF, γ | 11 | 1.5 | 0.23 | 44 | 0 | 0 | 59 | 3.0 | 0.3 | 0.1 | Example |
| 30 | R | F, BF, M, γ | 5 | 1.2 | 0.33 | 59 | 0 | 0 | 63 | 3.0 | 0.3 | 0.1 | Example |
| 31 | S | F, BF, M, γ | 4 | 1.1 | 0.21 | 31 | 0 | 0 | 72 | 2.0 | 2.4 | 0.02 | Example |
| 33 | S | F, BF, M, γ | 5 | 1.6 | 0.20 | 48 | 0 | 0 | 50 | 1.8 | 1.3 | 0.6 | Comp.Ex. |
| 34 | T | F, BF, M, γ | 5 | 3.2 | 0.17 | 90 | 0 | 10 | 35 | 4.1 | 0.4 | 0.03 | Example |
| 35 | T | Experiment stopped due to breaking of sheet by cold rolling | | | | | | | | | | | Comp.Ex. |
| 36 | U | F, BF, M, γ | 4 | 2.7 | 0.17 | 65 | 3 | 0 | 62 | 2.4 | 0.5 | 0.3 | Example |
| 37 | V | F, BF, 7 | 6 | 1.4 | 0.18 | 39 | 0 | 0 | 74 | 2.9 | 1.5 | 0.02 | Example |
| 38 | W | F, NRF, B, BF, tM, γ | 4 | 3.3 | 0.17 | 55 | 0 | 0 | 51 | 3.0 | 0.4 | 0.1 | Example |
| 39 | X | F, BF, M, γ | 3 | 1.5 | 0.19 | 50 | 0 | 0 | 60 | 3.0 | 0.4 | 0.03 | Example |
| 40 | X | F, BF, M, γ | 3 | 6.1 | 0.26 | 43 | 0 | 35 | 73 | 8.1 | 0.8 | 0.02 | Comp.Ex. |
| 41 | Y | F, B, M, γ | 3 | 2.4 | 0.28 | 82 | 0 | 0 | 51 | 2.0 | 0.3 | 0.03 | Example |
| 42 | Z | F, BF, M, γ | 6 | 1.9 | 0.28 | 35 | 0 | 0 | 75 | 2.4 | 0.4 | 0.02 | Example |
| 43 | Z | F, BF, M, γ | 5 | 9.1 | 0.33 | 0 | 0 | 40 | 50 | 12.8 | 0.4 | 0.02 | Comp.Ex. |
| 55 | AD | F, BF, M, γ | 1 | 2.1 | 0.23 | 51 | 0 | 0 | 60 | 1.7 | 1.5 | 0.02 | Example |
| 62 | AI | F, NRF, BF, M, γ | 1 | 1.6 | 0.27 | 54 | 0 | 0 | 47 | 3.1 | 1.3 | 0.02 | Example |
| 65 | AK | BF, B, M, γ | 2 | 1.4 | 0.19 | 31 | 0 | 0 | 63 | 4.7 | 2.3 | 0.03 | Example |
| 76 | AS | F, BF, γ | 13 | 1.3 | 0.28 | 37 | 0 | 0 | 50 | 0.5 | 0.7 | 0.1 | Example |
| 78 | AT | F, BF, γ | 8 | 1.6 | 0.35 | 56 | 0 | 0 | 46 | 3.1 | 2.3 | 0.01 | Example |
| 82 | AW | F, WF, BF, B, γ | 4 | 1.9 | 0.31 | 53 | 0 | 0 | 49 | 2.8 | 1.3 | 0.02 | Example |
| 89 | BC | Experiment stopped due to cracking of slab during cooling | | | | | | | | | | | Comp.Ex. |
| 91 | BE | Experiment stopped due to cracking of slab during heating | | | | | | | | | | | Comp.Ex. |
| 92 | BF | Experiment stopped due to cracking of slab during heating | | | | | | | | | | | Comp.Ex. |
| 94 | BH | Experiment stopped due to cracking of slab during cooling | | | | | | | | | | | Comp.Ex. |

TABLE 12

| | | | | | Plated layer | | | | Base steel sheet | | | |
| | | | | | ζ Phase | | | | | | | |
| | | | | | | Ratio | | | | | | |
| | | Microstructure | | | | Boundary surface occupancy ratio | of boundary surface where oxides present | δ1 Phase Boundary surface occupancy ratio | Plated amount | Average thickness of refined layer | Average grain size of ferrite phase | Maximum size of oxide | |
| Experimental Example | Chemical components | Constitutional structure | γ Fraction % | Content Fe % | Content Al % | % | % | % | g/m² | μm | μm | μm | Remarks |
|---|---|---|---|---|---|---|---|---|---|---|---|---|---|
| C1 | CA | F, BF, M, γ | 3 | 1.8 | 0.31 | 60 | 5 | 3 | 51 | 2.0 | 0.3 | 0.2 | Example |
| C2 | CA | NRF, F, B, γ | 5 | 1.0 | 0.27 | 34 | 0 | 0 | 63 | 3.1 | 0.3 | 0.04 | Example |
| C3 | CA | F, BF, B, M, γ | 6 | 0.8 | 0.31 | 22 | 0 | 0 | 58 | 2.5 | 0.9 | 0.04 | Example |
| C4 | CA | F, M, θ | 0 | 1.5 | 0.29 | 51 | 0 | 0 | 62 | 3.3 | 0.2 | 0.03 | Comp.Ex. |
| C5 | CA | F, P, B | 0 | 1.8 | 0.30 | 59 | 5 | 0 | 54 | 3.5 | 0.3 | 0.2 | Comp.Ex. |
| C6 | CA | F, BF, γ | 6 | 0.8 | 0.31 | 38 | 41 | 0 | 58 | 0.5 | 1.2 | 0.3 | Example |
| C7 | CA | F, B, BF, γ | 4 | 0.6 | 0.74 | 25 | 0 | 0 | 60 | 3.5 | 0.4 | 0.1 | Example |
| C8 | CA | F, BF, γ | 6 | 5.7 | 0.43 | 65 | 0 | 8 | 72 | 3.2 | 1.8 | 0.03 | Comp.Ex. |
| C9 | CA | F, M | 0 | 1.9 | 0.18 | 52 | 0 | 0 | 63 | 2.3 | 2.6 | 0.03 | Comp.Ex. |
| C10 | CA | F, BF, B, M, γ | 2 | 6.1 | 0.33 | 48 | 0 | 12 | 64 | 3.5 | 2.3 | 0.03 | Comp.Ex. |
| C11 | CB | F, BF, B, γ | 6 | 1.3 | 0.31 | 42 | 0 | 0 | 65 | 2.6 | 0.3 | 0.1 | Example |
| C12 | CB | F, BF, B, M, γ | 3 | 1.8 | 0.18 | 60 | 29 | 0 | 58 | 0.8 | 0.9 | 0.3 | Example |
| C13 | CB | F, BF, M, γ | 1 | 1.6 | 0.23 | 50 | 13 | 0 | 53 | 1.5 | 0.4 | 0.3 | Example |
| C14 | CB | F, BF, B, γ | 5 | 4.3 | 0.32 | 67 | 0 | 14 | 52 | 2.4 | 0.3 | 0.04 | Example |
| C15 | CB | F, P | 0 | 1.6 | 0.35 | 57 | 0 | 0 | 60 | 2.1 | 0.4 | 0.03 | Comp.Ex. |
| C16 | CB | F, BF, M | 0 | 1.7 | 0.27 | 54 | 0 | 0 | 56 | 1.8 | 0.4 | 0.02 | Comp.Ex. |
| C17 | CB | F, BF, B, M, γ | 4 | 0.4 | 1.20 | 0 | 0 | 0 | 52 | 3.2 | 0.4 | 0.02 | Comp.Ex. |
| C18 | CB | | | | | Experiment stopped | | | | | | | Comp.Ex. |
| C19 | CC | F, BF, γ | 9 | 2.3 | 0.20 | 68 | 0 | 5 | 45 | 1.5 | 0.3 | 0.1 | Example |
| C20 | CC | F, WF, BF, M, γ | 6 | 1.5 | 0.17 | 45 | 0 | 0 | 65 | 1.7 | 0.3 | 0.1 | Example |
| C21 | CC | F, B, tM, γ | 11 | 2.0 | 0.30 | 57 | 0 | 0 | 72 | 1.3 | 0.6 | 0.04 | Example |
| C22 | CC | | | | | Experiment stopped | | | | | | | Comp.Ex. |
| C23 | CC | F, BF, M, γ | 4 | 0.1 | 0.35 | 0 | 0 | 0 | 46 | <0.1 | (3.3) | (<0.01) | Comp.Ex. |
| C24 | CC | F, M | 0 | 2.4 | 0.20 | 51 | 0 | 0 | 54 | 1.7 | 2.3 | 0.01 | Comp.Ex. |
| C25 | CC | F, P, BF, B, M | 0 | 2.1 | 0.28 | 75 | 0 | 0 | 58 | 1.8 | 1.8 | 0.04 | Comp.Ex. |
| C26 | CC | F, BF, M | 0 | 2.2 | 0.26 | 63 | 0 | 0 | 51 | 1.7 | 0.3 | 0.1 | Comp.Ex. |
| C27 | CC | BF, B, M, γ | 10 | 1.8 | 0.34 | 60 | 0 | 0 | 50 | 1.7 | 0.4 | 0.1 | Example |
| C28 | CD | F, NRF, θ, M | 0 | 1.2 | 0.21 | 37 | 0 | 0 | 57 | 1.7 | 1.3 | 0.03 | Comp.Ex. |
| C29 | CD | F, BF, M, γ | 5 | 1.4 | 0.27 | 34 | 8 | 0 | 67 | 1.9 | 0.3 | 0.04 | Example |
| C30 | CD | F, BF, B, M | 0 | 1.5 | 0.26 | 36 | 0 | 0 | 63 | 2.3 | 1.4 | 0.04 | Comp.Ex. |
| C31 | CD | F, BF, B, M, γ | 3 | 2.0 | 0.17 | 45 | 5 | 0 | 57 | 1.7 | 0.8 | 0.03 | Example |
| C32 | CD | F, BF, B, tM, γ | 6 | 1.9 | 0.24 | 39 | 0 | 0 | 57 | 2.1 | 0.3 | 0.04 | Example |
| C33 | CD | F, BF, M, γ | 5 | 0.4 | 0.82 | 22 | 0 | 0 | 49 | 1.4 | 1.5 | 0.03 | Example |
| C34 | CE | F, B, BF | 0 | 2.2 | 0.37 | 50 | 0 | 0 | 36 | 3.1 | 0.4 | 0.02 | Comp.Ex. |
| C35 | CF | F, B, BF, γ | 2 | 1.3 | 0.23 | 65 | 0 | 0 | 46 | 3.1 | 0.4 | 0.03 | Example |
| C36 | CF | F, B, BF, γ | 3 | 4.6 | 0.09 | 75 | 0 | 17 | 60 | 3.9 | 0.9 | 0.03 | Example |
| C37 | CF | F, B, BF, P, θ | 0 | 1.2 | 0.20 | 60 | 0 | 0 | 50 | 2.5 | 0.4 | 0.04 | Comp.Ex. |
| C38 | CG | BF, M, γ | 29 | 2.6 | 0.25 | 63 | 0 | 0 | 50 | 2.8 | 0.3 | 0.1 | Comp.Ex. |
| C39 | CH | F, θ | 0 | 2.0 | 0.21 | 52 | 0 | 0 | 60 | 2.9 | 0.4 | 0.1 | Comp.Ex. |
| C40 | CI | F, P, θ | 0 | 2.5 | 0.23 | 73 | 0 | 0 | 61 | 2.2 | 0.4 | 0.1 | Comp.Ex. |
| C41 | CJ | F, BF, M, γ | 6 | 1.9 | 0.29 | 55 | 0 | 0 | 48 | 2.1 | 0.4 | 0.03 | Comp.Ex. |
| C42 | CK | F, BF, M, γ | 6 | 2.0 | 0.22 | 51 | 0 | 0 | 55 | 2.2 | 0.4 | 0.02 | Comp.Ex. |
| C43 | CL | F, BF, B, M, γ | 9 | 1.7 | 0.30 | 68 | 0 | 0 | 63 | 1.9 | 0.4 | 0.03 | Comp.Ex. |
| C44 | CC | F, BF, γ | 8 | 2.2 | 0.21 | 72 | 73 | 14 | 50 | 2.3 | 0.7 | 0.2 | Comp.Ex. |

TABLE 13

| Experimental Example | Chemical components | Thickness t mm | Tensile properties Maximum tensile strength TS MPa | Tensile properties Total elongation El % | Hole expansibility λ % | $TS^{1.5} \times El \times \lambda^{0.5}$ | Plating adhesion | Spot weldability | Corrosion resistance | Chipping Properties | Powdering properties | Remarks |
|---|---|---|---|---|---|---|---|---|---|---|---|---|
| 1 | A | 1.7 | 861 | 24 | 34 | 3.5E+06 | o | o | o | o | o | Example |
| 2 | A | 1.2 | 765 | 29 | 35 | 3.6E+06 | o | o | o | o | o | Example |
| 3 | A | 1.8 | 694 | 35 | 29 | 3.4E+06 | x | o | o | o | o | Comp.Ex. |
| 4 | B | 1.4 | 558 | 37 | 57 | 3.7E+06 | o | o | o | o | o | Example |
| 5 | B | 2.0 | 597 | 33 | 45 | 3.2E+06 | o | o | o | o | o | Example |
| 6 | B | Experiment stopped due to disablement of annealing treatment by shape defect of steel sheet | | | | | | | | | | Comp.Ex. |
| 7 | C | 1.4 | 1017 | 21 | 29 | 3.7E+06 | o | o | o | o | o | Example |
| 9 | C | 1.4 | 1010 | 18 | 28 | 3.1E+06 | x | o | x | o | o | Comp.Ex. |
| 10 | D | 1.3 | 738 | 27 | 37 | 3.3E+06 | o | o | o | o | o | Example |
| 12 | D | 2.3 | 853 | 23 | 41 | 3.7E+06 | o | o | o | o | o | Example |
| 13 | E | 13 | 804 | 22 | 54 | 3.7E+06 | o | o | o | o | o | Example |
| 14 | F | 1.7 | 748 | 25 | 41 | 3.3E+06 | o | o | o | o | o | Example |
| 15 | G | 1.2 | 741 | 31 | 34 | 3.6E+06 | o | o | o | o | o | Example |
| 17 | I | 1.4 | 950 | 23 | 28 | 3.6E+06 | o | o | o | o | o | Example |
| 18 | J | 1.9 | 1042 | 17 | 35 | 3.4E+06 | o | o | o | o | o | Example |
| 20 | J | 1.0 | 981 | 17 | 46 | 3.5E+06 | o | o | o | o | o | Example |
| 21 | K | 1.3 | 1090 | 17 | 26 | 3.1E+06 | o | o | o | o | o | Example |
| 22 | L | 1.2 | 847 | 24 | 33 | 3.4E+06 | o | o | o | o | o | Example |
| 25 | N | 2.2 | 948 | 22 | 27 | 3.3E+06 | o | o | o | o | o | Example |
| 26 | N | 1.0 | 885 | 23 | 25 | 3.0E+06 | x | o | o | x | x | Comp.Ex. |
| 27 | O | 2.0 | 918 | 22 | 38 | 3.8E+06 | o | o | o | o | o | Example |
| 28 | P | 1.8 | 582 | 27 | 53 | 2.8E+06 | o | o | o | o | o | Example |
| 29 | Q | 2.0 | 823 | 27 | 29 | 3.4E+06 | o | o | o | o | o | Example |
| 30 | R | 1.3 | 804 | 26 | 30 | 3.2E+06 | o | o | o | o | o | Example |
| 31 | S | 1.2 | 755 | 26 | 35 | 3.2E+06 | o | o | o | o | o | Example |
| 33 | S | 1.0 | 692 | 27 | 27 | 2.6E+06 | x | o | o | o | x | Comp.Ex. |
| 34 | T | 1.4 | 819 | 23 | 45 | 3.6E+06 | o | o | o | o | o | Example |
| 35 | T | Experiment stopped due to breaking of sheet by cold rolling | | | | | | | | | | Comp.Ex. |
| 36 | U | 1.4 | 1109 | 19 | 24 | 3.4E+06 | o | o | o | o | o | Example |
| 37 | V | 1.4 | 791 | 22 | 45 | 3.3E+06 | o | o | o | o | o | Example |
| 38 | W | 1.6 | 692 | 26 | 38 | 2.9E+06 | o | o | o | o | o | Example |
| 39 | X | 1.7 | 639 | 32 | 49 | 3.6E+06 | o | o | o | o | o | Example |
| 40 | X | 1.0 | 558 | 33 | 37 | 2.6E+06 | x | o | o | x | x | Comp.Ex. |
| 41 | Y | 1.7 | 845 | 23 | 35 | 3.3E+06 | o | o | o | o | o | Example |
| 42 | Z | 1.9 | 1010 | 20 | 30 | 3.5E+06 | o | o | o | o | o | Example |
| 43 | Z | 1.0 | 831 | 19 | 26 | 2.3E+06 | o | o | o | x | x | Comp.Ex. |
| 55 | AD | 1.0 | 643 | 29 | 42 | 3.1E+06 | o | o | o | o | o | Example |
| 62 | AI | 1.3 | 598 | 33 | 35 | 2.9E+06 | o | o | o | o | o | Example |
| 65 | AK | 2.0 | 843 | 19 | 41 | 3.0E+06 | o | o | o | o | o | Example |
| 76 | AS | 1.4 | 781 | 28 | 35 | 3.6E+06 | o | o | o | o | o | Example |
| 78 | AT | 1.4 | 721 | 28 | 33 | 3.1E+06 | o | o | o | o | o | Example |
| 82 | AW | 1.4 | 584 | 39 | 37 | 3.3E+06 | o | o | o | o | o | Example |
| 89 | BC | Experiment stopped due to occurrence of cracking of slab during cooling | | | | | | | | | | Comp.Ex. |
| 91 | BE | Experiment stopped due to occurrence of cracking of slab during heating | | | | | | | | | | Comp.Ex. |
| 92 | BF | Experiment stopped due to occurrence of cracking of slab during heating | | | | | | | | | | Comp.Ex. |
| 94 | BH | Experiment stopped due to occurrence of cracking of slab during cooling | | | | | | | | | | Comp.Ex. |

TABLE 14

| Experimental Example | Chemical components | Thickness t mm | Tensile properties Maximum tensile strength TS MPa | Tensile properties Total elongation El % | Hole expansibility λ % | $TS^{1.5} \times El \times \lambda^{0.5}$ | Plating adhesion | Spot weldability | Corrosion resistance | Chipping Properties | Powdering properties | Remarks |
|---|---|---|---|---|---|---|---|---|---|---|---|---|
| C1 | CA | 1.7 | 861 | 24 | 34 | 3.5E+06 | o | o | o | o | o | Example |
| C2 | CA | 1.4 | 902 | 18 | 31 | 2.7E+06 | o | o | o | o | o | Example |
| C3 | CA | 1.2 | 765 | 29 | 35 | 3.6E+06 | o | o | o | o | o | Example |
| C4 | CA | 1.2 | 733 | 18 | 26 | 1.8E+06 | o | o | o | o | o | Comp.Ex. |
| C5 | CA | 1.2 | 587 | 23 | 41 | 2.1E+06 | o | o | o | o | o | Comp.Ex. |
| C6 | CA | 0.8 | 642 | 37 | 42 | 3.9E+06 | o | o | o | o | o | Example |
| C7 | CA | 1.8 | 714 | 32 | 29 | 3.3E+06 | o | o | o | o | o | Example |
| C8 | CA | 1.4 | 628 | 34 | 39 | 3.3E+06 | x | o | o | x | x | Comp.Ex. |
| C9 | CA | 1.4 | 836 | 19 | 24 | 2.2E+06 | o | o | o | o | o | Comp.Ex. |
| C10 | CA | 1.8 | 694 | 35 | 29 | 3.4E+06 | x | o | o | x | x | Comp.Ex. |
| C11 | CB | 0.7 | 558 | 37 | 57 | 3.7E+06 | o | o | o | o | o | Example |
| C12 | CB | 2.1 | 599 | 30 | 43 | 2.9E+06 | o | o | o | o | o | Example |

TABLE 14-continued

| Experimental Example | Chemical components | Thickness t mm | Tensile properties Maximum tensile strength TS MPa | Tensile properties Total elongation El % | Hole expansibility λ % | $TS^{1.5} \times El \times \lambda^{0.5}$ | Plating adhesion | Spot weldability | Corrosion resistance | Chipping Properties | Powdering properties | Remarks |
|---|---|---|---|---|---|---|---|---|---|---|---|---|
| C13 | CB | 0.9 | 660 | 26 | 39 | 2.8E+06 | ○ | ○ | ○ | ○ | ○ | Example |
| C14 | CB | 1.0 | 494 | 42 | 51 | 3.3E+06 | ○ | ○ | ○ | ○ | ○ | Example |
| C15 | CB | 1.2 | 567 | 19 | 27 | 1.3E+06 | ○ | ○ | ○ | ○ | ○ | Comp.Ex. |
| C16 | CB | 1.2 | 701 | 15 | 28 | 1.5E+06 | ○ | ○ | ○ | ○ | ○ | Comp.Ex. |
| C17 | CB | 1.0 | 637 | 28 | 41 | 2.9E+06 | x | ○ | ○ | ○ | ○ | Comp.Ex. |
| C18 | CB | | | | Experiment stopped | | | | | | | Comp.Ex. |
| C19 | CC | 1.8 | 1016 | 20 | 32 | 3.7E+06 | ○ | ○ | ○ | ○ | ○ | Example |
| C20 | CC | 2.5 | 981 | 16 | 34 | 2.9E+06 | ○ | ○ | ○ | ○ | ○ | Example |
| C21 | CC | 1.8 | 930 | 21 | 55 | 4.4E+06 | ○ | ○ | ○ | ○ | ○ | Example |
| C22 | CC | | | | Experiment stopped | | | | | | | Comp.Ex. |
| C23 | CC | 1.8 | 920 | 19 | 27 | 2.8E+06 | x | ○ | ○ | ○ | ○ | Comp.Ex. |
| C24 | CC | 1.2 | 1033 | 9 | 19 | 1.3E+06 | ○ | ○ | ○ | ○ | ○ | Comp.Ex. |
| C25 | CC | 1.2 | 867 | 17 | 28 | 2.3E+06 | ○ | ○ | ○ | ○ | ○ | Comp.Ex. |
| C26 | CC | 1.2 | 1068 | 13 | 25 | 2.3E+06 | ○ | ○ | ○ | ○ | ○ | Comp.Ex. |
| C27 | CC | 1.0 | 1201 | 11 | 42 | 3.0E+06 | ○ | ○ | ○ | ○ | ○ | Example |
| C28 | CD | 1.3 | 814 | 15 | 19 | 1.5E+06 | ○ | ○ | ○ | ○ | ○ | Comp.Ex. |
| C29 | CD | 1.0 | 680 | 34 | 41 | 3.9E+06 | ○ | ○ | ○ | ○ | ○ | Example |
| C30 | CD | 1.4 | 666 | 26 | 29 | 2.4E+06 | ○ | ○ | ○ | ○ | ○ | Comp.Ex. |
| C31 | CD | 1.8 | 703 | 27 | 32 | 2.8E+06 | ○ | ○ | ○ | ○ | ○ | Example |
| C32 | CD | 2.2 | 709 | 23 | 64 | 3.5E+06 | ○ | ○ | ○ | ○ | ○ | Example |
| C33 | CD | 0.8 | 649 | 31 | 29 | 2.8E+06 | ○ | ○ | ○ | ○ | ○ | Example |
| C34 | CE | 1.3 | 580 | 27 | 37 | 2.3E+06 | ○ | ○ | ○ | ○ | ○ | Comp.Ex. |
| C35 | CF | 1.4 | 624 | 23 | 51 | 2.6E+06 | ○ | ○ | ○ | ○ | ○ | Example |
| C36 | CF | 1.6 | 604 | 28 | 45 | 2.8E+06 | ○ | ○ | ○ | ○ | ○ | Example |
| C37 | CF | 1.4 | 510 | 26 | 37 | 1.8E+06 | ○ | ○ | ○ | ○ | ○ | Comp.Ex. |
| C38 | CG | 1.3 | 1075 | 27 | 19 | 4.1E+06 | ○ | x | ○ | ○ | ○ | Comp.Ex. |
| C39 | CH | 1.3 | 362 | 32 | 95 | 2.1E+06 | ○ | ○ | ○ | ○ | ○ | Comp.Ex. |
| C40 | CI | 1.0 | 449 | 25 | 52 | 1.7E+06 | ○ | ○ | ○ | ○ | ○ | Comp.Ex. |
| C41 | CJ | 1.2 | 673 | 19 | 17 | 1.4E+06 | ○ | ○ | ○ | ○ | ○ | Comp.Ex. |
| C42 | CK | 1.7 | 740 | 14 | 19 | 1.2E+06 | ○ | ○ | ○ | ○ | ○ | Comp.Ex. |
| C43 | CL | 1.9 | 905 | 10 | 8 | 7.7E+05 | ○ | ○ | ○ | ○ | ○ | Comp.Ex. |
| C44 | CC | 1.8 | 1000 | 20 | 35 | 3.7E+06 | x | ○ | ○ | ○ | ○ | Comp.Ex. |

Experimental Example 89 is an example in which the experiment was stopped since the Si content was high and the slab was cracked during cooling in the casting step.

Experimental Example 92 is an example in which the experiment was stopped since the P content was high and the slab was cracked during heating in the hot rolling step.

Experimental Example 94 is an example in which the experiment was stopped since the Al content was high and the slab was cracked during cooling in the casting step.

Experimental Example 33 is an example in which since the heating rate in the annealing step was low, the growth of the oxides in the base steel sheet excessively proceeded to form coarse oxides working as a fracture origin on the surface of the base steel sheet, plating adhesion and powdering properties were deteriorated.

Experimental Example C44 is an example in which since the preheating completion temperature was high and a large number of coarse oxides including Si and Mn were formed on the steel sheet surface before plating, the ratio of the interface formed between the grains in which coarse oxides are present and the base steel sheet with respect to the entire interface between the ζ phase and the base steel sheet was more than 50%, and thus plating adhesion is inferior.

Experimental Example 9 is an example in which since the air ratio in the excess heat zone in the annealing step was low, the boundary surface occupancy ratio of the ζ phase was low, and unplating occurred in parts of the steel sheet, external appearance, plating adhesion, and corrosion resistance were deteriorated.

Experimental Example 43 is an example in which since the air ratio in the excess heat zone in the annealing step was high and decarburization in the steel sheet surface excessively proceeded, the average thickness of the refined layer was thick and $TS^{1.5} \times El \times \lambda^{0.5}$ was lowered so that sufficient properties could not be obtained.

Experimental Example 3 is an example in which since the value of Expression 1 was too small and a sufficient amount of the ζ phase was not formed at the interface between the plated layer and base steel sheet, and sufficient plating adhesion could not be obtained.

Experimental Example 26 is an example in which since the value of Expression 1 in the plating step was too large and Fe % in the plated layer was excessively high, sufficient plating adhesion could not be obtained.

Experimental Example C39 is an example in which since the C content was low, residual austenite was not formed, and the volume fraction of the hard phase was low, sufficient tensile strength could not be obtained.

Experimental Example C38 is an example in which the C content was high and spot weldability and formability were deteriorated.

Experimental Example C40 is an example in which since the Mn content was low, large amounts of pearlite and coarse cementite were formed in the annealing step and the plating step, and residual austenite was not formed, and the tensile strength and formability of the steel sheet could not be sufficiently obtained.

Experimental Example 91 is an example in which the experiment was stopped since the Mn content was high and the slab was cracked during heating in the hot rolling step.

Experimental Example C41 is an example in which since the S content was high and a large amount of coarse sulfides were formed, ductility and hole expansibility were deteriorated.

Experimental Example C42 is an example in which since the N content was high and a large amount of coarse nitrides were formed, ductility and hole expansibility were deteriorated.

Experimental Example C43 is an example in which since the O content was high and a large amount of coarse oxides were formed, ductility and hole expansibility were deteriorated.

Experimental Example C34 is an example in which since Si and Al contents did not satisfy Expression (2), a large amount of carbides were formed, and residual austenite could not be obtained, a balance between strength and formability was deteriorated.

Experimental Example C18 is an example in which the experiment was stopped since the hot rolling completion temperature was low and the shape of the steel sheet was significantly deteriorated.

Experimental Example C22 is an example in which the experiment was stopped since the temperature at which the steel sheet was coiled after hot rolling was low and the steel sheet was broken in the cold rolling step.

Experimental Example 6 is an example in which the hot-rolled steel sheet was not subjected to cold rolling and the experiment was stopped since the degree of flatness of the sheet was poor and an annealing treatment could not be performed.

Experimental Example 35 is an example in which the experiment was stopped since the rolling reduction in cold rolling was excessively high and the steel sheet was broken.

Experimental Example C4 is an example in which since the maximum heating temperature in the annealing step was low, residual austenite was not formed, a large amount of coarse cementite was present in the steel sheet, and $TS^{1.5} \times El \times \lambda^{0.5}$ was deteriorated, sufficient properties could not be obtained.

Experimental Example C28 is an example in which since the maximum heating temperature in the annealing step was lower than Ac1+50° C., residual austenite was not formed, a large amount of coarse cementite was present in the steel sheet, and $TS^{1.5} \times El \times \lambda^{0.5}$ was deteriorated, sufficient properties could not be obtained.

Experimental Example C23 is an example in which since the ratio between the water vapor partial pressure $P(H_2O)$ and the hydrogen partial pressure $P(H_2)$, $P(H_2O)/P(H_2)$, in the reduction zone in the annealing step was low, the grain size of the surface was not refined, and ζ phase formation did not proceed in the plated layer, plating adhesion was deteriorated. In Experimental Example C23, the refined layer was not formed, the average grain size of the ferrite in the surface of the base steel sheet was 3.3 μm, and the maximum size of the oxides was less than 0.01 μm inside the steel sheet within a range up to a depth of 0.5 μm from the surface.

Experimental Example 40 is an example in which since the ratio between the water vapor partial pressure $P(H_2O)$ and the hydrogen partial pressure $P(H_2)$, $P(H_2O)/P(H_2)$, in the reduction zone in the annealing step was high, the refined layer of the surface of the base steel sheet was excessively thick, and alloying of the plated layer excessively proceeded, plating adhesion, powdering properties, and chipping properties were deteriorated.

Experimental Example C5 is an example in which since the average cooling rate from 750° C. to 700° C. was low, a large amount of carbides was formed, residual austenite could not be obtained, a balance between strength and formability was deteriorated.

Experimental Example C15 is an example in which since the average cooling rate from 700° C. to 500° C. was low, a large amount of carbides was formed, residual austenite could not be obtained, a balance between strength and formability was deteriorated.

Experimental Example C24 is an example in which since the bainitic transformation treatment was not performed before or after the plating treatment and residual austenite could not be obtained, a balance between strength and formability was deteriorated.

Experimental Example C25 is an example in which since the bainitic transformation treatment temperature before the plating treatment was high, a large amount of carbides was formed, and residual austenite could not be obtained, a balance between strength and formability was deteriorated.

Experimental Example C26 is an example in which since the bainitic transformation treatment temperature before the plating treatment was low, the progress of bainitic transformation was excessively suppressed, and residual austenite could not be obtained, a balance between strength and formability was deteriorated.

Experimental Example C9 is an example in which since the bainitic transformation treatment time before the plating treatment was short, bainitic transformation did not proceed sufficiently, and residual austenite could not be obtained, a balance between strength and formability was deteriorated.

Experimental Example C37 is an example in which since the bainitic transformation treatment time before the plating treatment was long, a large amount of carbides were formed, and residual austenite could not be obtained, a balance between strength and formability was deteriorated.

Experimental Example C8 is an example in which since the bainitic transformation treatment temperature after the plating treatment was high, the value of Expression (1) was excessively increased, and the amount of Fe in the plated layer was increased, plating adhesion was deteriorated.

Experimental Example C16 is an example in which since the bainitic transformation treatment temperature after the plating treatment was low, the progress of bainitic transformation was excessively suppressed, and residual austenite could not be obtained, a balance between strength and formability was deteriorated.

Experimental Example C30 is an example in which since the sum of the bainitic transformation treatment time before the plating treatment and the bainitic transformation treatment time after the plating treatment was small, bainitic transformation did not sufficiently proceed, and residual austenite could not be obtained, a balance between strength and formability was deteriorated.

Experimental Example C10 is an example in which since the amount of effective Al in the plating bath in the plating step was too small, the value of Expression 1 was too large, Fe % in the plated layer was excessively high, sufficient plating adhesion could not be obtained.

Experimental Example C17 is an example in which since the amount of effective Al in the plating bath in the plating step was excessively large, the value of Expression 1 was excessively small, and a sufficient amount of the δ phase was not formed at the interface between the plated layer, the base steel sheet and sufficient plating adhesion could not be obtained.

Experimental Examples other than the above examples are examples in which hot-dip galvanized steel sheets having excellent strength, ductility, hole expansibility, spot weldability, and plating adhesion were obtained.

Example 2

A test piece was collected from the plated steel sheet of Experimental Example 1 obtained in "Example 1". Next, the thickness cross section of the test piece parallel to the rolling direction of the base steel sheet was used as an observed section and polished by ion milling and thus a backscattered electron (BSE) image was obtained with a field emission scanning electron microscope (FE-SEM) under the condition of an accelerating voltage of 5 kV. The results thereof are shown in FIG. 2.

Figure 2:
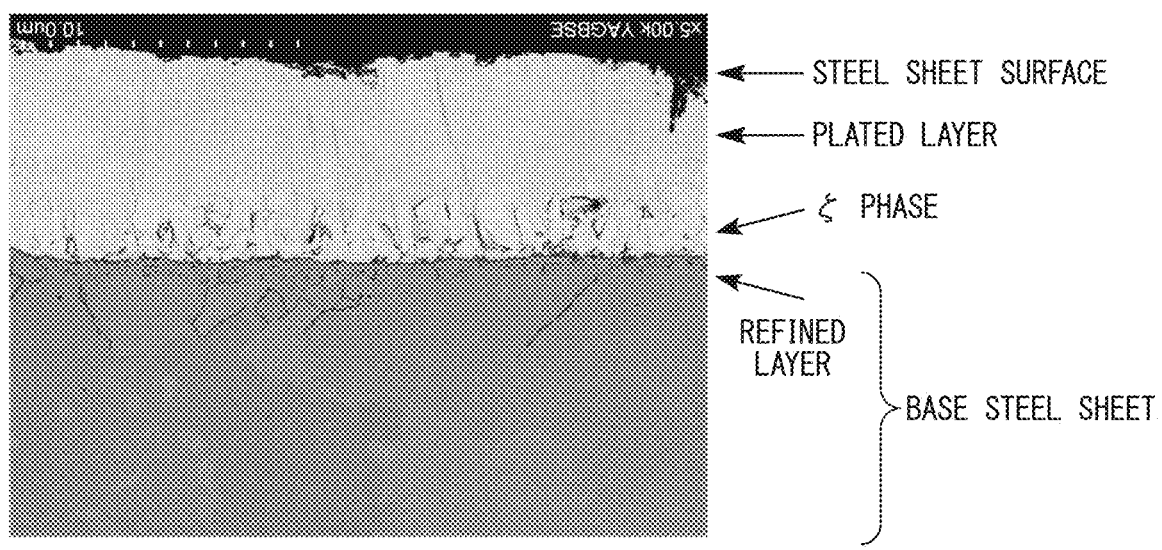
FIG. 2 is a field emission scanning electron microscope (FE-SEM) micrograph showing a cross section of a hot-dip galvanized steel sheet according to the embodiment.

As shown in FIG. 2, a plated layer including columnar grains formed of the ζ phase was formed in the plated steel sheet of Experimental Example 1. In addition, a refined layer in direct contact with the interface with the plated layer was formed in the base steel sheet of the plated steel sheet of Experimental Example 1. As shown in FIG. 2, the refined layer of the plated steel sheet of Experimental Example 1 included oxides (parts appearing darker than surroundings).

Example 3

A cold-rolled steel sheet was produced in the same manner as in the production of the plated steel sheet of Experimental Example 1 obtained in "Example 1", and subjected to an annealing step in the same manner as in the annealing of the plated steel sheet of Experimental Example 1 to obtain an annealed sheet. The annealed sheet was immersed in a zinc plating bath under the conditions (the amount of effective Al, the plating bath temperature (bath temperature), the steel sheet entering temperature, the immersion time) for the plating step shown in Table 15 to be plated.

After the plating step, a cooling treatment was performed under the condition (Expression (1)) for the cooling step after plating shown in Table 15. Further, cold rolling was performed under the condition (the rolling reduction) shown in Table 15 and thus plated steel sheets of Experimental Examples 104 to 111 were obtained.

Regarding the obtained plated steel sheets, the plated layer of the base steel sheet was observed in the same manner as in "Example 1". The results are shown in Table 15.

Regarding the obtained plated steel sheets, the volume fraction (γ fraction) of the residual austenite was measured in the same manner as in "Example 1". The results are shown in Table 15.

Regarding the obtained plated steel sheets, the plated amount was obtained in the same manner as in "Example 1". The results are shown in Table 15.

Regarding the obtained plated steel sheets, the average thickness of the refined layer, the average grain size of the ferrite, and the maximum size of the oxides were obtained in the same manner as in "Example 1". The results are shown in Table 15.

Regarding the obtained plated steel sheets, a tensile test, a hole expansion test, a bending test, an adhesion evaluation test, a spot welding test, and a corrosion test were performed in the same manner as in "Example 1". The results are shown in Table 15.

In addition, the results of Experimental Example 1 are collectively shown in Table 15.

TABLE 15

| Experimental Example | Chemical components | Plating step Plating bath Effective Al % by mass | Bath temperature °C. | Entering temperature °C. | Immersion time sec | Cooling step after plating Expression (1) | Cold rolling Rolling reduction % | Plated layer Fe content % | Al content % | ζ Boundary surface occupancy ratio % | ζ Boundary ζ Oxides present boundary surface ratio % | δ Boundary surface occupancy ratio % | Plated amount g/m² | Microstructure γ Fraction % | Base steel sheet Average thickness of refined layer μm | Average grain size of ferrite phase μm | Maximum size of oxide μm | TS^1.5 × El × λ^0.5 | Plating adhesion | Spot weldability | Corrosion resistance | Remarks |
|---|---|---|---|---|---|---|---|---|---|---|---|---|---|---|---|---|---|---|---|---|---|---|
| 1 | A | 0.104 | 459 | 459 | 3 | 0.62 | 0.16 | 1.7 | 0.34 | 62 | 0 | 0 | 61 | 3 | 3.1 | 0.8 | 0.03 | 3.5E+06 | ○ | ○ | ○ | Example |
| 104 | A | 0.104 | 459 | 459 | 3 | 0.09 | 0.16 | 0.2 | 0.34 | 3 | 0 | 0 | 60 | 3 | 2.8 | 1.5 | 0.1 | 3.4E+06 | × | × | ○ | Comp.Ex. |
| 105 | A | 0.104 | 459 | 459 | 10 | 1.11 | 0.2 | 1.2 | 0.31 | 50 | 0 | 0 | 64 | 3 | 3.4 | 1.4 | 0.1 | 3.4E+06 | ○ | ○ | ○ | Example |
| 106 | A | 0.104 | 459 | 459 | 20 | 1.70 | 0.2 | 2.4 | 0.30 | 68 | 0 | 0 | 70 | 3 | 3.4 | 1.1 | 0.1 | 3.4E+06 | ○ | ○ | ○ | Example |
| 107 | A | 0.104 | 459 | 459 | 70 | 2.11 | 0.2 | 4.1 | 0.32 | 100 | 0 | 0 | 80 | 2 | 4.0 | 0.9 | 0.1 | 3.4E+06 | ○ | ○ | ○ | Example |
| 108 | A | 0.136 | 463 | 463 | 30 | 0.89 | 0.2 | 2.3 | 0.43 | 70 | 0 | 0 | 70 | 3 | 2.4 | 1.2 | 0.04 | 3.4E+06 | ○ | ○ | ○ | Example |
| 109 | A | 0.136 | 463 | 463 | 70 | 1.05 | 0.2 | 2.7 | 0.44 | 80 | 0 | 0 | 75 | 3 | 3.0 | 1.1 | 0.04 | 3.5E+06 | ○ | ○ | ○ | Example |
| 110 | A | 0.17 | 469 | 469 | 70 | 0.57 | 0.2 | 1.7 | 0.56 | 70 | 0 | 0 | 69 | 2 | 3.0 | 1.2 | 0.1 | 3.5E+06 | ○ | ○ | ○ | Example |
| 111 | A | 0.17 | 469 | 469 | 100 | 0.82 | 0.2 | 1.8 | 0.56 | 100 | 0 | 0 | 75 | 3 | 2.5 | 1.5 | 0.1 | 3.5E+06 | ○ | ○ | ○ | Example |

As shown in Table 15, Experimental Examples 105 to 111 as examples of the present invention had satisfactory plating adhesion and excellent spot weldability and corrosion resistance.

In contrast, as shown in Table 15, in Experimental Example 104, the ratio of the interface between the ζ phase and the base steel sheet in the entire interface between the plated layer and the base steel sheet (ζ boundary surface occupancy ratio) was less than 20% and thus plating adhesion and spot weldability were not sufficient.

Although each embodiment of the present invention has been described in detail above, all of these embodiments are merely examples of embodiments in implementation of the present invention. The technical scope of the present invention should not be interpreted as limited only by the embodiments. That is, the present invention can be implemented in various forms without departing from the technical idea thereof or the main features thereof.

INDUSTRIAL APPLICABILITY

The present invention is an effective technology for a hot-dip galvanized steel sheet excellent in plating adhesion. According to the present invention, it is possible to provide a hot-dip galvanized steel sheet excellent in plating adhesion after forming.

The invention claimed is:

1. A hot-dip galvanized steel sheet comprising:
a base steel sheet; and
a hot-dip galvanized layer formed on at least one surface of the base steel sheet, wherein:
the hot-dip galvanized layer includes, % by mass, Fe in a content of more than 0% to 5% or less, Al in a content of more than 0% to 1.0% or less, and columnar grains formed by a ζ phase on the surface of the steel sheet, further, 20% or more of an entire interface between the hot-dip galvanized layer and the base steel sheet is coated with the ζ phase, and a ratio of an interface between coarse oxide-containing ζ grains and the base steel sheet is 50% or less with respect to an entire interface between the ζ phase and the base steel sheet in the hot-dip galvanized layer,
a ratio of an interface between a δ1 phase and the base steel sheet is 20% or less with respect to the entire interface between the hot-dip galvanized layer and the base steel sheet;
the base steel sheet includes a chemical composition which satisfies, % by mass,
C: 0.040% to 0.400%,
Si: 0.05% to 2.50%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%, and
Si+0.7Al≥0.30 (in the expression, element symbols represent the content (% by mass) of each element), with a remainder of Fe and unavoidable impurities;
the base steel sheet has a refined layer in direct contact with the interface between the base steel sheet and the hot-dip galvanized layer, an average thickness of the refined layer is 0.1 to 5.0 μm, an average grain size of ferrite in the refined layer is 0.1 to 3.0 μm, one or two or more of oxides of Si and Mn are contained in the refined layer, and a maximum size of the oxides is 0.01 to 0.4 μm; and
a volume fraction of residual austenite in a range of ⅛ thickness to ⅜ thickness centered at a position of ¼ thickness from the surface of the base steel sheet is 1% or more,
a plating of the hot-dip galvanized steel sheet is not peeled off under a plating adhesion evaluation with DuPont impact test,
wherein the plating adhesion evaluation is performed by performing DuPont impact test to the hot-dip galvanized steel sheet to which 5% uniaxial tension strain was applied,
attaching an adhesive tape to the hot-dip galvanized steel sheet after the impact test,
peeling off the adhesive tape from the hot-dip galvanized steel sheet after attaching the adhesive tape,
confirming whether or not the plating of the hot-dip galvanized steel sheet is peeled off,
wherein DuPont impact test was performed by dropping a weight of 3 kg onto the hot-dip galvanized steel sheet from a height of 1 m using a punching die having a radius of curvature of a front end of ½.

2. The hot-dip galvanized steel sheet according to claim 1, wherein a plated amount of the hot-dip galvanized layer on one surface of the base steel sheet is 10 g/m² or more and 100 g/m² or less.

3. The hot-dip galvanized steel sheet according to claim 1, wherein the base steel sheet further contains, % by mass, one or two or more selected from
Ti: 0.001% to 0.150%,
Nb: 0.001% to 0.100%, and
V: 0.001% to 0.300%.

4. The hot-dip galvanized steel sheet according to claim 2, wherein the base steel sheet further contains, % by mass, one or two or more selected from
Ti: 0.001% to 0.150%,
Nb: 0.001% to 0.100%, and
V: 0.001% to 0.300%.

5. The hot-dip galvanized steel sheet according to claim 1, wherein the base steel sheet further contains, % by mass, one or two or more selected from
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

6. The hot-dip galvanized steel sheet according to claim 2, wherein the base steel sheet further contains, % by mass, one or two or more selected from
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

7. The hot-dip galvanized steel sheet according to claim 3, wherein the base steel sheet further contains, % by mass, one or two or more selected from
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

8. The hot-dip galvanized steel sheet according to claim 4, wherein the base steel sheet further contains, % by mass, one or two or more selected from Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

9. The hot-dip galvanized steel sheet according to claim 1, wherein the base steel sheet further contains, % by mass, one or two or more selected from Ca, Ce, Mg, Zr, La, and REM in a total amount of 0.0001% to 0.0100%.

10. The hot-dip galvanized steel sheet according to claim 2, wherein the base steel sheet further contains, % by mass, one or two or more selected from Ca, Ce, Mg, Zr, La, and REM in a total amount of 0.0001% to 0.0100%.

11. The hot-dip galvanized steel sheet according to claim 3, wherein the base steel sheet further contains, % by mass, one or two or more selected from Ca, Ce, Mg, Zr, La, and REM in a total amount of 0.0001% to 0.0100%.

12. The hot-dip galvanized steel sheet according to claim 4, wherein the base steel sheet further contains, % by mass, one or two or more selected from Ca, Ce, Mg, Zr, La, and REM in a total amount of 0.0001% to 0.0100%.

13. The hot-dip galvanized steel sheet according to claim 5, wherein the base steel sheet further contains, % by mass, one or two or more selected from Ca, Ce, Mg, Zr, La, and REM in a total amount of 0.0001% to 0.0100%.

14. The hot-dip galvanized steel sheet according to claim 6, wherein the base steel sheet further contains, % by mass, one or two or more selected from Ca, Ce, Mg, Zr, La, and REM in a total amount of 0.0001% to 0.0100%.

15. The hot-dip galvanized steel sheet according to claim 7, wherein the base steel sheet further contains, % by mass, one or two or more selected from Ca, Ce, Mg, Zr, La, and REM in a total amount of 0.0001% to 0.0100%.

16. The hot-dip galvanized steel sheet according to claim 8, wherein the base steel sheet further contains, % by mass, one or two or more selected from Ca, Ce, Mg, Zr, La, and REM in a total amount of 0.0001% to 0.0100%.

* * * * *